US012407111B2

(12) United States Patent
Liu et al.

(10) Patent No.: US 12,407,111 B2
(45) Date of Patent: Sep. 2, 2025

(54) ANTENNA DEVICE

(71) Applicant: Molex, LLC, Lisle, IL (US)

(72) Inventors: Hai Liu, Shanghai (CN); Guang-Yong Zhong, Shanghai (CN); Ping Zhang, Shanghai (CN); Chun-Xia Zhang, Shanghai (CN); Kang Cheng, Shanghai (CN)

(73) Assignee: Molex, LLC, Lisle, IL (US)

( * ) Notice: Subject to any disclaimer, the term of this patent is extended or adjusted under 35 U.S.C. 154(b) by 416 days.

(21) Appl. No.: 18/116,858

(22) Filed: Mar. 3, 2023

(65) Prior Publication Data

US 2023/0299482 A1 Sep. 21, 2023

(30) Foreign Application Priority Data

Mar. 16, 2022 (CN) ......................... 202210259312.9

(51) Int. Cl.

| | |
|---|---|
| ***H01Q 21/30*** | (2006.01) |
| ***H01Q 1/24*** | (2006.01) |
| ***H01Q 1/48*** | (2006.01) |
| ***H01Q 1/52*** | (2006.01) |
| ***H01Q 9/42*** | (2006.01) |

(52) U.S. Cl.
CPC ............ *H01Q 21/30* (2013.01); *H01Q 1/241* (2013.01); *H01Q 1/48* (2013.01); *H01Q 1/521* (2013.01); *H01Q 9/42* (2013.01)

(58) Field of Classification Search
CPC ............ H01Q 1/38; H01Q 1/241; H01Q 1/48; H01Q 1/521; H01Q 9/42; H01Q 21/30
See application file for complete search history.

(56) References Cited

U.S. PATENT DOCUMENTS

| | | | | |
|---|---|---|---|---|
| 10,916,851 B2 * | 2/2021 | Wei | ...................... | H01Q 9/0407 |
| 2014/0191918 A1 * | 7/2014 | Cheng | .................. | H01Q 21/205 343/834 |
| 2020/0235495 A1 * | 7/2020 | Yang | ...................... | H01Q 1/241 |
| 2022/0102853 A1 * | 3/2022 | Shen | ........................ | H01Q 1/48 |

(Continued)

FOREIGN PATENT DOCUMENTS

| | | | |
|---|---|---|---|
| CN | 209804903 U | 12/2019 | |
| CN | 107799894 B | 10/2021 | |
| CN | 114696085 A * | 7/2022 | ............... H01Q 1/48 |

(Continued)

*Primary Examiner* — Dameon E Levi
*Assistant Examiner* — Leah Rosenberg

(57) ABSTRACT

An antenna device includes: a dielectric substrate; a first grounding face, a second grounding face and a third grounding face which are provided on a first face of the dielectric substrate and are isolated from each other; a first primary antenna and a first auxiliary antenna which are provided on the first face, cooperatively act with the first grounding face to operate at a first frequency range and are isolated from each other; a second primary antenna and a second auxiliary antenna which cooperatively act with the first grounding face to operate at a second frequency range and are isolated from each other; a third primary antenna which cooperatively acts with the second grounding face to operate at a third frequency range; and a third auxiliary antenna which cooperatively acts with the third grounding face to operate at the third frequency range.

20 Claims, 12 Drawing Sheets

(56) References Cited

U.S. PATENT DOCUMENTS

2022/0166148 A1* 5/2022 Zhang .................... H01Q 1/521

FOREIGN PATENT DOCUMENTS

| | | | | |
|---|---|---|---|---|
| KR | 20040004218 | A | 1/2004 | |
| KR | 20080052676 | A | 6/2008 | |
| KR | 20160119501 | A | 10/2016 | |
| KR | 20190041389 | A | 4/2019 | |
| TW | 201914102 | A | 4/2019 | |
| TW | I750825 | B | 12/2021 | |
| WO | WO-2019129044 | A1 * | 7/2019 | ............. H01Q 21/30 |

* cited by examiner

ANTENNA DEVICE

RELATED APPLICATIONS

This application claims priority to Chinese Patent Application No. 202210259312.9, filed Mar. 16, 2022, which is incorporated herein by reference in its entirety.

TECHNICAL FIELD

The present disclosure relates to an antenna, and particularly relates to an antenna device which integrates a multiple-purpose antenna therein.

BACKGROUND

As the market's demand for communication continuously increases, the fifth-generation (5G) mobile communication is booming and popularized rapidly. The demand for integration of mobile communication, WIFI communication, and global positioning and navigation from automotive, medical, and Internet of Things devices is becoming more and wider. Therefore, the requirements of the above multiple communication modes propose new challenge to the design of the antenna. In addition, in order to improve the communication capacity, data transferring speed and anti-multipath fading capability of the communication system, a multiple-input multiple-output system (abbreviated as MIMO) which uses multiple antennas to perform communications at the same time at each of a transmitting end and a receiving end become a key technology.

The MIMO communication of a mobile communication terminal requires at least two antennas (a primary antenna and an auxiliary antenna), and in order to ensure an isolation degree between the primary antenna and the auxiliary antenna, dimensions of the antennas are usually required to be as large as possible. However, a dimension of the mobile communication terminal is relatively small, even for vehicle-mounted antennas, due to the limitation of the mounting space on the vehicle, dimensions of the antennas are required to be as small as possible. In addition, because 5G antennas need to be compatible with 2G, 3G and Sub 6G frequency bands, a bandwidth of the antennas are relatively wide, and the dimensions of the antennas need to be increased. In this way, there is a confliction. On one hand, the antennas need larger dimensions for good performance, and on the other hand, the dimensions of the antennas are required to be as small as possible in practical use. However, the current 5G MIMO antenna system is either large in dimension or makes the primary antenna and the auxiliary antenna divided into two independent antennas and mounted separately. But this will increase the overall manufacturing cost and mounting cost of the antennas. Otherwise, the dimensions of the antennas are reduced by reducing performance of the antennas, but this approach will greatly reduce the isolation degree between the primary antenna and auxiliary antenna of the MIMO antenna system, which makes the overall data throughput of the communication system difficult to be increased.

SUMMARY

Therefore, an object of the present disclosure is to provide an antenna device which integrates multiple types of antennas and considers antenna dimension and antenna performance at the same time so as to provide a small dimension multiple-in-one antenna which meets requirement on multiple frequency bands and high isolation degree.

Accordingly, an antenna device of the present disclosure comprises a circuit board, the circuit board comprises: a dielectric substrate which has a first face; a first primary antenna and a first auxiliary antenna which operate at a first frequency range, are provided on the first face of the dielectric substrate respectively and are isolated from each other; a second primary antenna and a second auxiliary antenna which operate at a second frequency range, are provided on the first face of the dielectric substrate respectively and are isolated from each other; a third primary antenna and a third auxiliary antenna which operate at a third frequency range, are provided on the first face of the dielectric substrate respectively and are isolated from each other; and a grounding unit comprising a first grounding face, a second grounding face and a third grounding face which are provided on the first face of the dielectric substrate and are isolated from each other, the first grounding face is positioned between the first primary antenna and the first auxiliary antenna to space the first primary antenna apart from the first auxiliary antenna, the first grounding face, the first primary antenna and the first auxiliary antenna cooperatively act, and the first grounding face is positioned between the second primary antenna and the second auxiliary antenna to space the second primary antenna apart from the second auxiliary antenna, the first grounding face, the second primary antenna and the second auxiliary antenna cooperatively act, the second grounding face is adjacent to the third primary antenna and the second grounding face and the third primary antenna cooperatively act, the third grounding face is adjacent to the third auxiliary antenna and the third grounding face and the third auxiliary antenna cooperatively act.

In some embodiments of the present disclosure, the first grounding face is provided with a first primary grounding portion, a first auxiliary grounding portion, a second primary grounding portion and a second auxiliary grounding portion, and the first primary antenna has a first primary feed-in portion which is adjacent to the first primary grounding portion, is surrounded by the first grounding face and is spaced apart from the first grounding face, the first auxiliary antenna has a first auxiliary feed-in portion which is adjacent to the first auxiliary grounding portion, is surrounded by the first grounding face and is spaced apart from the first grounding face, the second primary antenna has a second primary feed-in portion which is adjacent to the second primary grounding portion, is surrounded by the first grounding face and is spaced apart from the first grounding face, the second auxiliary antenna has a second auxiliary feed-in portion which is adjacent to the second auxiliary grounding portion, is surrounded by the first grounding face and is spaced apart from the first grounding face; the second grounding face is provided with a third primary grounding portion, and the third primary antenna has a third primary feed-in portion which is adjacent to the third primary grounding portion, is surrounded by the second grounding face and is spaced apart from the second grounding face; the third grounding face is provided with a third auxiliary grounding portion, and the third auxiliary antenna has a third auxiliary feed-in portion which is adjacent to the third auxiliary grounding portion, is surrounded by the third grounding face and is spaced apart from the third grounding face.

In some embodiments of the present disclosure, the first primary feed-in portion and the first primary grounding portion respectively allow an inner conductor and an outer conductor of a first radio frequency transmitting line to soldered therewith; the first auxiliary feed-in portion and the first auxiliary grounding portion respectively allow an inner conductor and an outer conductor of a second radio frequency transmitting line to be soldered therewith; the second primary feed-in portion and the second primary grounding portion respectively allow an inner conductor and an outer conductor of a third radio frequency transmitting line to be soldered therewith; the second auxiliary feed-in portion and the second auxiliary grounding portion respectively allow an inner conductor and an outer conductor of a fourth radio frequency transmitting line to be soldered therewith; the third primary feed-in portion and the third primary grounding portion respectively allow an inner conductor and an outer conductor of a fifth radio frequency transmitting line to be soldered therewith; the third auxiliary feed-in portion and the third auxiliary grounding portion respectively allow an inner conductor and an outer conductor of a sixth radio frequency transmitting line to be soldered therewith.

In some embodiments of the present disclosure, the dielectric substrate has a first side edge and a second side edge which are opposite to each other and a third side edge and a fourth side edge which are connected with the first side edge and the second side edge and are opposite to each other, the first side edge, the second side edge, the third side edge and the fourth side edge define a periphery of the dielectric substrate; the first primary antenna is positioned in a corner which is surrounded by the first side edge and the third side edge, the first auxiliary antenna is positioned in a corner which is surrounded by the first side edge and the fourth side edge, the second primary antenna is close to the first side edge and is positioned between the first primary antenna and the first auxiliary antenna, the second auxiliary antenna is close to the fourth side edge and is positioned between the first auxiliary antenna and the third auxiliary antenna, the third primary antenna is positioned in a corner which is surrounded by the second side edge and the third side edge, the third auxiliary antenna is positioned in a corner which is surrounded by the second side edge and the fourth side edge.

In some embodiments of the present disclosure, the first primary antenna comprises a first primary monopole antenna which is connected with the first primary feed-in portion and a first primary parasitic antenna which extends outwardly from the first grounding face, is spaced apart from the first primary monopole antenna and is adjacent to the first primary monopole antenna to mutually electrically couple; the first auxiliary antenna comprises a first auxiliary monopole antenna which is connected with the first auxiliary feed-in portion and a first auxiliary parasitic antenna which extends outwardly from the first grounding face is spaced apart from and is adjacent to the first auxiliary monopole antenna mutually electrically couple, the second primary antenna comprises a second primary monopole antenna which is connected with the second primary feed-in portion, the second auxiliary antenna comprises a second auxiliary monopole antenna which is connected with the second auxiliary feed-in portion, the third primary antenna comprises a third primary monopole antenna which is connected with the third primary feed-in portion, the third auxiliary antenna comprises a third auxiliary monopole antenna which is connected with the third auxiliary feed-in portion.

In some embodiments of the present disclosure, the first primary monopole antenna further comprises a first microstrip line, the first microstrip line extends outwardly from the first primary monopole antenna, enters into the first grounding face and is spaced apart from the first grounding face, and connects the first primary feed-in portion; the first auxiliary monopole antenna further comprises a second microstrip line, the second microstrip line extends outwardly from the first auxiliary monopole antenna, enters into the first grounding face and is spaced apart from the first grounding face, and connects the first auxiliary feed-in portion; the second primary monopole antenna further comprises a third microstrip line, the third microstrip line extends outwardly from the second primary monopole antenna, enters into the first grounding face and is spaced apart from the first grounding face, and connects the second primary feed-in portion; the second auxiliary monopole antenna further comprises a fourth microstrip line, the fourth microstrip line extends outwardly from the second auxiliary monopole antenna, enters into the first grounding face and is spaced apart from the first grounding face, and connects the second auxiliary feed-in portion; the third primary monopole antenna further comprises a fifth microstrip line, the fifth microstrip line extends outwardly from the third primary monopole antenna, enters into the second grounding face and is spaced apart from the second grounding face, and connects the third primary feed-in portion; the third auxiliary monopole antenna further comprises a sixth microstrip line, the sixth microstrip line extends outwardly from the third auxiliary monopole antenna, enters into the third grounding face and is spaced apart from the third grounding face, and connects the third auxiliary feed-in portion.

In some embodiments of the present disclosure, the dielectric substrate further has a second face which is opposite to the first face, the grounding unit further comprises a first extending ground face, a second extending ground face and a third extending ground face which are provided on the second face of the dielectric substrate, the first extending ground face and the first grounding face correspond to each other and the first extending ground face and the first grounding face are formed therebetween with a plurality of conductive through-holes which electrically connect the first extending ground face and the first grounding face; the second extending ground face and the second grounding face correspond to each other and the second extending ground face and the second grounding face are formed therebetween with a plurality of conductive through-holes which electrically connect the second extending ground face and the second grounding face;

the third extending ground face and the third grounding face correspond to each other and the third extending ground face and the third grounding face are formed therebetween with a plurality of conductive through-holes which electrically connect the third extending ground face and the third grounding face.

In some embodiments of the present disclosure, the first grounding face and the first extending ground face are formed therebetween with: a plurality of conductive through-holes which surround the first primary feed-in portion, extend along two sides of the first microstrip line and electrically connect the first grounding face and the first extending ground face, a plurality of conductive through-holes which surround the first auxiliary feed-in portion, extend along two sides of the second microstrip line and electrically connect the first grounding face and the first extending ground face, a plurality of conductive through-holes which surround the second primary feed-in portion, extend along two sides of the third microstrip line and electrically connect the first grounding face and the first extending ground face, and a plurality of conductive through-holes which surround the second auxiliary feed-in portion, extend along two sides of the fourth microstrip line and electrically connect the first grounding face and the first extending ground face; the second grounding face and the second extending ground face are formed therebetween with a plurality of conductive through-holes which surround the third primary feed-in portion, extend along two sides of the fifth microstrip line and electrically connect the second grounding face and the second extending ground face; the third grounding face and the third extending ground face are formed therebetween with a plurality of conductive through-holes which surround the third auxiliary feed-in portion, extend along two sides of the sixth microstrip line and electrically connect the third grounding face and the third extending ground face.

In some embodiments of the present disclosure, wherein the first extending ground face is provided therein with a first primary ground soldering pad, a first auxiliary ground soldering pad, a second primary ground soldering pad and a second auxiliary ground soldering pad, and the second face is provided thereon with a first primary feed-in soldering pad which is adjacent to the first primary ground soldering pad, is surrounded by the first extending ground face and is spaced apart from the first extending ground face, the second face is provided thereon with a first auxiliary feed-in soldering pad which is adjacent to the first auxiliary ground soldering pad, is surrounded by the first extending ground face and is spaced apart from the first extending ground face, the second face is provided thereon with a second primary feed-in soldering pad which adjacent to the second primary ground soldering pad, is surrounded by the first extending ground face and is spaced apart from the first extending ground face, the second face is provided thereon with a second auxiliary feed-in soldering pad which is adjacent to the second auxiliary ground soldering pad, is surrounded by the first extending ground face and is spaced apart from the first extending ground face; wherein the second extending ground face is provided therein with a third primary ground soldering pad, and the second face is provided thereon with a third primary feed-in soldering pad which is adjacent to the third primary ground soldering pad, is surrounded by the second extending ground face and is spaced apart from the second extending ground face; wherein the third extending ground face is provided therein with a third auxiliary ground soldering pad, and the second face is provided thereon with a third auxiliary feed-in soldering pad which is adjacent to the third auxiliary ground soldering pad, is surrounded by the third extending ground face and is spaced apart from the third extending ground face; wherein the first primary feed-in soldering pad and the first primary feed-in portion correspond to each other and the first primary feed-in soldering pad and the first primary feed-in portion are formed therebetween with a plurality of conductive through-holes which electrically connect the first primary feed-in soldering pad and the first primary feed-in portion, the first primary ground soldering pad and the first primary grounding portion correspond to each other and the first primary ground soldering pad and the first primary grounding portion are formed therebetween with a plurality of conductive through-holes which electrically connect the first primary ground soldering pad and the first primary grounding portion; the first auxiliary feed-in soldering pad and the first auxiliary feed-in portion correspond to each other and the first auxiliary feed-in soldering pad and the first auxiliary feed-in portion are formed therebetween with a plurality of conductive through-holes which electrically connect the first auxiliary feed-in soldering pad and the first auxiliary feed-in portion, the first auxiliary ground soldering pad and the first auxiliary grounding portion correspond to each other and the first auxiliary ground soldering pad and the first auxiliary grounding portion are formed therebetween with a plurality of conductive through-holes which electrically connect the first auxiliary ground soldering pad and the first auxiliary grounding portion; the second primary feed-in soldering pad and the second primary feed-in portion correspond to each other and the second primary feed-in soldering pad and the second primary feed-in portion are formed therebetween with a plurality of conductive through-holes which electrically connect the second primary feed-in soldering pad and the second primary feed-in portion, the second primary ground soldering pad and the second primary grounding portion correspond to each other and the second primary ground soldering pad and the second primary grounding portion are formed therebetween with a plurality of conductive through-holes which electrically connect the second primary ground soldering pad and the second primary grounding portion; the second auxiliary feed-in soldering pad and the second auxiliary feed-in portion correspond to each other and the second auxiliary feed-in soldering pad and the second auxiliary feed-in portion are formed therebetween with a plurality of conductive through-holes which electrically connect the second auxiliary feed-in soldering pad and the second auxiliary feed-in portion, the second auxiliary ground soldering pad and the second auxiliary grounding portion correspond to each other and the second auxiliary ground soldering pad and the second auxiliary grounding portion are formed therebetween with a plurality of conductive through-holes which electrically connect the second auxiliary ground soldering pad and the second auxiliary grounding portion, wherein the third primary feed-in soldering pad and the third primary feed-in portion correspond to each other and the third primary feed-in soldering pad and the third primary feed-in portion are formed therebetween with a plurality of conductive through-holes which electrically connect the third primary feed-in soldering pad and the third primary feed-in portion, the third primary ground soldering pad and the third primary grounding portion correspond to each other and the third primary ground soldering pad and the third primary grounding portion are formed therebetween with a plurality of conductive through-holes which electrically connect the third primary ground soldering pad and the third primary grounding portion; the third auxiliary feed-in soldering pad and the third auxiliary feed-in portion correspond to each other and the third auxiliary feed-in soldering pad and the third auxiliary feed-in portion are formed therebetween with a plurality of conductive through-holes which electrically connect the third auxiliary feed-in soldering pad and the third auxiliary feed-in portion, the third auxiliary ground soldering pad and the third auxiliary grounding portion correspond to each other and the third auxiliary ground soldering pad and the third auxiliary grounding portion are formed therebetween with a plurality of conductive through-holes which electrically connect the third auxiliary ground soldering pad and the third auxiliary grounding portion.

In some embodiments of the present disclosure, the first primary feed-in soldering pad is used to be soldered with an inner conductor of a first radio frequency transmitting line, the first primary ground soldering pad is used to be soldered with an outer conductor of the first radio frequency transmitting line which is insulated from the inner conductor of the first radio frequency transmitting line; the first auxiliary feed-in soldering pad is used to be soldered with an inner conductor of a second radio frequency transmitting line, the first auxiliary ground soldering pad is used to be soldered with an outer conductor of the second radio frequency transmitting line which is insulated from the inner conductor of the second radio frequency transmitting line; the second primary feed-in soldering pad is used to be soldered with an inner conductor of a third radio frequency transmitting line, the second primary ground soldering pad is used to be soldered with an outer conductor of the third radio frequency transmitting line which is insulated from the inner conductor of the third radio frequency transmitting line; the second auxiliary feed-in soldering pad is used to be soldered with an inner conductor of a fourth radio frequency transmitting line, the second auxiliary ground soldering pad is used to be soldered with an outer conductor of the fourth radio frequency transmitting line which is insulated from the inner conductor of the fourth radio frequency transmitting line; the third primary feed-in soldering pad is used to be soldered with an inner conductor of a fifth radio frequency transmitting line, the third primary ground soldering pad is used to be soldered with an outer conductor of the fifth radio frequency transmitting line which is insulated from the inner conductor of the fifth radio frequency transmitting line; the third auxiliary feed-in soldering pad is used to be soldered with an inner conductor of a sixth radio frequency transmitting line, the third auxiliary ground soldering pad is used to be soldered with an outer conductor of the sixth radio frequency transmitting line which is insulated from the inner conductor of the sixth radio frequency transmitting line.

In some embodiments of the present disclosure, the antenna device further comprises an outer casing which accommodates the circuit board and at least one elastic filler which is filled in at least one opening of the outer casing, and the first to sixth radio frequency transmitting lines enter into the outer casing via the at least one opening, and the at least one elastic filler allows the first to sixth radio frequency transmitting lines to pass through, so as to fix the first to sixth radio frequency transmitting lines on the outer casing.

In some embodiments of the present disclosure, the antenna device further comprises a global navigation satellite system antenna, the global navigation satellite system antenna comprises a daughter circuit board which is separated from the circuit board and a ceramic dielectric antenna which operates at a fourth frequency range, the ceramic dielectric antenna is provided on a face of the daughter circuit board.

In some embodiments of the present disclosure, the ceramic dielectric antenna has a feeding pin, the face of the daughter circuit board is provided with a grounding portion, the feeding pin and the grounding portion respectively allow an inner conductor and an outer conductor of a seventh radio frequency transmitting line to be electrically connected therewith.

In some embodiments of the present disclosure, the global navigation satellite system antenna further comprises a low-noise amplifying circuit, the low-noise amplifying circuit is provided on another face the daughter circuit board, the ceramic dielectric antenna is electrically connected with the low-noise amplifying circuit via a feeding pin which passes through the daughter circuit board; and a feed-in end of the low-noise amplifying circuit is electrically connected with an inner conductor of a seventh radio frequency transmitting line, and an outer conductor of the seventh radio frequency transmitting line which is insulated from the inner conductor of the seventh radio frequency transmitting line is electrically connected with a ground soldering pad which is formed on the another face, and the ground soldering pad is electrically connected with a grounding portion which is provided on the face of the daughter circuit board.

In some embodiments of the present disclosure, the antenna device further comprises a global navigation satellite system antenna provided on the dielectric substrate, the global navigation satellite system antenna comprises a ceramic dielectric antenna which operate at a fourth frequency range, the ceramic dielectric antenna is provided on the first face of the dielectric substrate.

In some embodiments of the present disclosure, the ceramic dielectric antenna has a feeding pin, the first face of the dielectric substrate is provided with a grounding portion, the feeding pin and the grounding portion respectively allow an inner conductor and an outer conductor of a seventh radio frequency transmitting line to be electrically connected therewith.

In some embodiments of the present disclosure, the global navigation satellite system antenna further comprises a low-noise amplifying circuit, the low-noise amplifying circuit is provided on the second face of the dielectric substrate, the ceramic dielectric antenna is electrically connected with the low-noise amplifying circuit via a feeding pin which passes through the dielectric substrate; and a feed-in end of the low-noise amplifying circuit is electrically connected with an inner conductor of a seventh radio frequency transmitting line, and an outer conductor of the seventh radio frequency transmitting line which is insulated from the inner conductor of the seventh radio frequency transmitting line is electrically connected with a ground soldering pad which is formed on the second face, and the ground soldering pad is electrically connected with a grounding portion which is provided on the first face.

In some embodiments of the present disclosure, the first primary antenna, the first auxiliary antenna, the second primary antenna, the second auxiliary antenna, the third primary antenna, the third auxiliary antenna, the grounding unit and the first to sixth microstrip lines are respectively formed from copper foils which are printed on the first face and the second face of the dielectric substrate.

In some embodiments of the present disclosure, the first primary antenna is a LTE/5G wide frequency band primary antenna, the first auxiliary antenna is LTE/5G wide frequency band auxiliary antenna, the second primary antenna is a WiFi wide frequency band primary antenna, the second auxiliary antenna is a WiFi wide frequency band auxiliary antenna, the third primary antenna is a 5G wide frequency band primary antenna, and the third auxiliary antenna is a 5G wide frequency band auxiliary antenna.

An effect of the present disclosure lies in that: various types of antennas are integrated on the circuit board which is single and the antenna device has a small dimension, the present disclosure solves the problem that the traditional multiple-in-one antenna cannot meet small dimension, multiple frequency band operation and high isolation degree at the same time.

BRIEF DESCRIPTION OF THE DRAWINGS

Other features and effects of the present disclosure will be apparent in an embodiment referring to the accompanying drawings, in which.

DETAILED DESCRIPTION OF THE PREFERRED EMBODIMENTS

Figure 1:
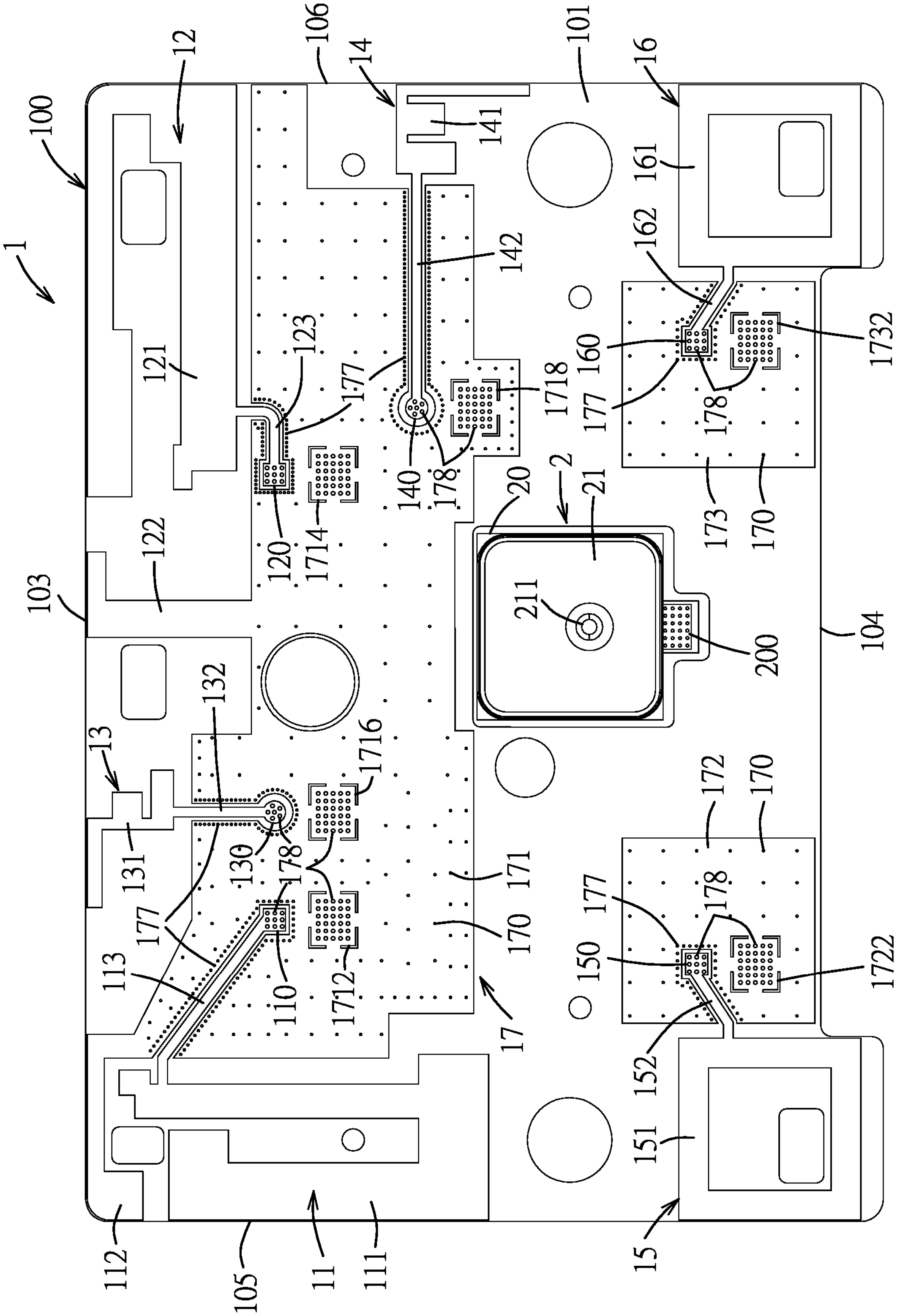
FIG. 1 is a construction schematic view of a first face of a circuit board of an embodiment of an antenna device of the present disclosure.

Before the present disclosure is described in detail, it is noted that the similar components are indicated by the same reference numerals in the following description.

Figure 2:
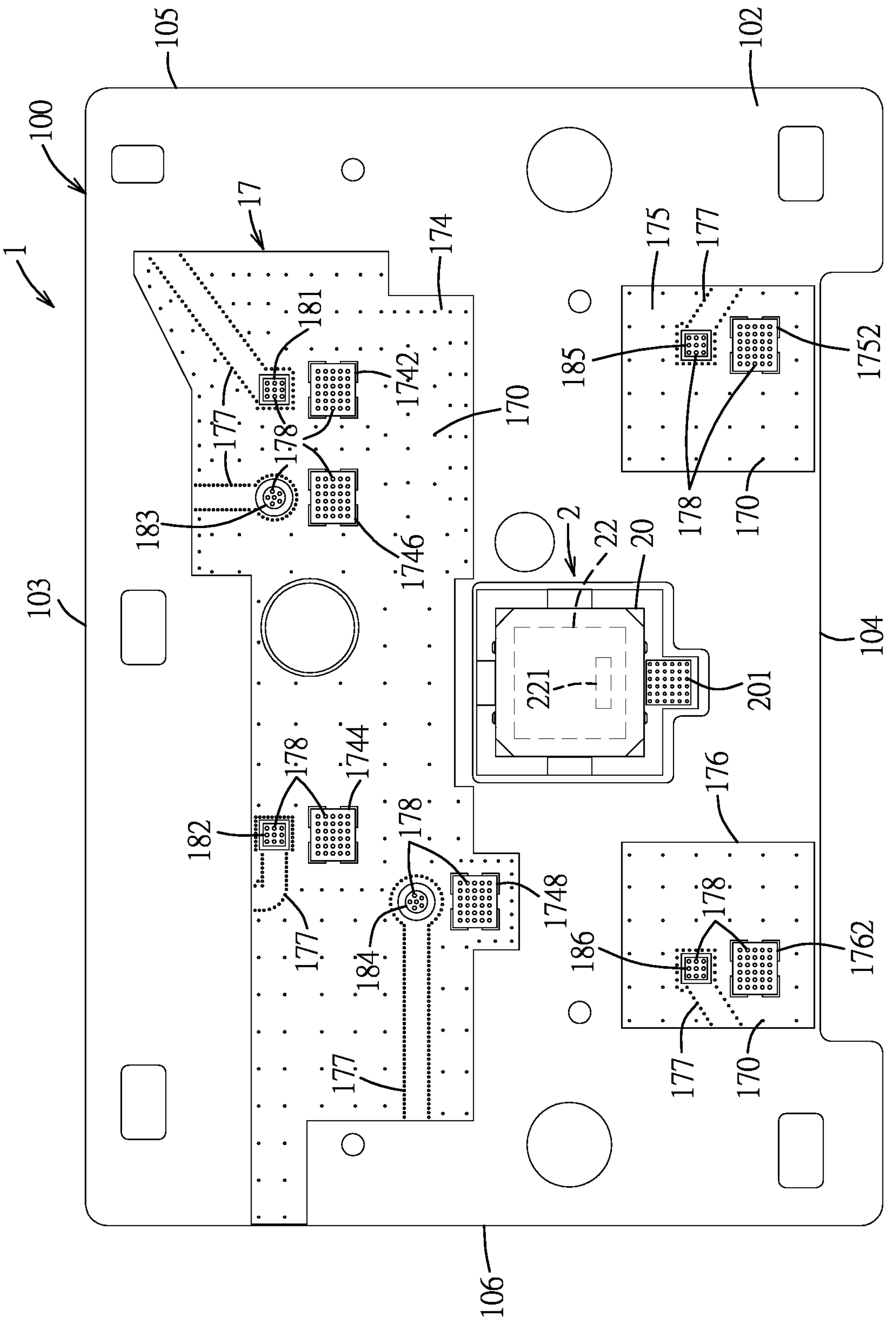
FIG. 2 is a construction schematic view of a second face of the circuit board of the present embodiment.

Referring to FIG. 1 and FIG. 2, an embodiment of an antenna device of the present disclosure includes a circuit board 1 which includes a dielectric substrate 100, the dielectric substrate 100 has a first face 101 and a second face 102 which are opposite to each other; and the circuit board 1 further includes a first primary antenna 11 and a first auxiliary antenna 12 which operate at a first frequency range, are provided on the first face 101 of the dielectric substrate 100 respectively and are isolated from each other, a second primary antenna 13 and a second auxiliary antenna 14 which operate at a second frequency range, are provided on the first face 101 of the dielectric substrate 100 respectively and are isolated from each other, a third primary antenna 15 and a third auxiliary antenna 16 which operate at a third frequency range, are provided on the first face 101 of the dielectric substrate 100 respectively and are isolated from each other, and a grounding unit 17.

The grounding unit 17 includes a first grounding face 171, a second grounding face 172 and a third grounding face 173 which are provided on the first face 101 of the dielectric substrate 100 and are isolated from each other, and a first extending ground face 174, a second extending ground face 175 and a third extending ground face 176 which are provided on the second face 102 of the dielectric substrate 100, the first extending ground face 174 and the first grounding face 171 correspond to each other and the first extending ground face 174 and the first grounding face 171 are formed therebetween with a plurality of conductive through-holes 170 to electrically connect the first extending ground face 174 and the first grounding face 171, the second extending ground face 175 and the second grounding face 172 correspond to each other and the second extending ground face 175 and the second grounding face 172 are formed therebetween with a plurality of conductive through-holes 170 to electrically connect the second extending ground face 175 and the second grounding face 172, the third extending ground face 176 and the third grounding face 173 correspond to each other and the third extending ground face 176 and the third grounding face 173 are formed therebetween with a plurality of conductive through-holes 170 to electrically connect the third extending ground face 176 and the third grounding face 173.

The first grounding face 171 is positioned between the first primary antenna 11 and the first auxiliary antenna 12 to space the first primary antenna 11 apart from the first auxiliary antenna 12, and the first grounding face 171 and the first primary antenna 11 and the first auxiliary antenna 12 cooperatively act; and the first grounding face 171 is positioned between the second primary antenna 13 and the second auxiliary antenna 14 to space the second primary antenna 13 apart from the second auxiliary antenna 14, and the first grounding face 171, the second primary antenna 13 and the second auxiliary antenna 14 cooperatively act; the second grounding face 172 is adjacent to the third primary antenna 15, and the second grounding face 172 and the third primary antenna 15 cooperatively act; and the third grounding face 173 is adjacent to the third auxiliary antenna 16, and the third grounding face 173 and the third auxiliary antenna 16 cooperatively act.

Specifically, the dielectric substrate 100 has a first side edge 103 and a second side edge 104 which are opposite to each other and a third side edge 105 and a fourth side edge 106 which are connected with the first side edge 103 and the second side edge 104 and are opposite to each other, the first side edge 103, the second side edge 104, the third side edge 105 and the fourth side edge 106 define a periphery of the dielectric substrate 100.

The first grounding face 171 is close to the first side edge 103 of the dielectric substrate 100 and is provided therein with a first primary grounding portion 1712, a first auxiliary grounding portion 1714, a second primary grounding portion 1716, and a second auxiliary grounding portion 1718. The first primary antenna 11 has a first primary feed-in portion 110 which is adjacent to the first primary grounding portion 1712, is surrounded by the first grounding face 171 and is spaced apart from the first grounding face 171, the first auxiliary antenna 12 has a first auxiliary feed-in portion 120 which is adjacent to the first auxiliary grounding portion 1714, is surround by the first grounding face 171 and is spaced apart from the first grounding face 171, the second primary antenna 13 has a second primary feed-in portion 130 which is adjacent to the second primary grounding portion 1716, is surrounded by the first grounding face 171 and is spaced apart from the first grounding face 171, the second auxiliary antenna 14 has a second auxiliary feed-in portion 140 which is adjacent to the second auxiliary grounding portion 1718, is surrounded by the first grounding face 171 and is spaced apart from the first grounding face 171.

The second grounding face 172 is close to the second side edge 104 and the third side edge 105 of the dielectric substrate 100 and is provided therein with a third primary grounding portion 1722, and the third primary antenna 15 has a third primary feed-in portion 150 which is adjacent to the third primary grounding portion 1722, is surrounded by the second grounding face 172 and is spaced apart from the second grounding face 172. The third grounding face 173 is close to the second side edge 104 and the fourth side edge 106 of the dielectric substrate 100 and is provided therein with a third auxiliary grounding portion 1732, and the third auxiliary antenna 16 has a third auxiliary feed-in portion 160 which is adjacent to the third auxiliary grounding portion 1732, is surrounded by the third grounding face 173 and is spaced apart from the third grounding face 173.

The first primary antenna 11 is substantially positioned in a corner which is surrounded by the first side edge 103 and the third side edge 105, and the first primary antenna 11 includes a first primary monopole antenna 111 which is connected with the first primary feed-in portion 110 and a first primary parasitic antenna 112 which extends outwardly from the first grounding face 171, is spaced apart from the first primary monopole antenna 111 and is adjacent to the first primary monopole antenna 111 to mutually electrically couple. The first auxiliary antenna 12 is substantially positioned in a corner which is surrounded by the first side edge 103 and the fourth side edge 106, and the first auxiliary antenna 12 includes a first auxiliary monopole antenna 121 which is connected with the first auxiliary feed-in portion 120 and a first auxiliary parasitic antenna 122 which extends outwardly from the first grounding face 171, is spaced apart from the first auxiliary monopole antenna 121 and is adjacent to the first auxiliary monopole antenna 121 to mutually electrically couple.

The second primary antenna 13 is close to the first side edge 103 and is positioned between the first primary antenna 11 and the first auxiliary antenna 12, and includes a second primary monopole antenna 131 which is connected with the second primary feed-in portion 130. The second auxiliary antenna 14 is close to the fourth side edge 106 and is positioned between the first auxiliary antenna 12 and the third auxiliary antenna 16, and includes a second auxiliary monopole antenna 141 which is connected with the second auxiliary feed-in portion 140.

The third primary antenna 15 is positioned in a corner which is surrounded by the second side edge 104 and the third side edge 105, and the third primary antenna 15 includes a third primary monopole antenna 151 which is connected with the third primary feed-in portion 150. The third auxiliary antenna 16 is positioned in a corner which is surrounded by the second side edge 104 and the fourth side edge 106, and the third auxiliary antenna 16 includes a third auxiliary monopole antenna 161 which is connected with the third auxiliary feed-in portion 160.

In the present embodiment, the first primary monopole antenna 111 further includes a first microstrip line 113, the first microstrip line 113 extends outwardly from the first primary monopole antenna 111, enters into the first grounding face 171 and is spaced apart from the first grounding face 171, and connects the first primary feed-in portion 110. The first auxiliary monopole antenna 121 further includes a second microstrip line 123, the second microstrip line 123 extends outwardly from the first auxiliary monopole antenna 121, enters into the first grounding face 171 and is spaced apart from the first grounding face 171, and connects the first auxiliary feed-in portion 120.

The second primary monopole antenna 131 further includes a third microstrip line 132, the third microstrip line 132 extends outwardly from the second primary monopole antenna 131, enters into the first grounding face 171 and is spaced apart from the first grounding face 171, and connects the second primary feed-in portion 130. The second auxiliary monopole antenna 141 further includes a fourth microstrip line 142, the fourth microstrip line 142 extends outwardly from the second auxiliary monopole antenna 141, enters into the first grounding face 171 and is spaced apart from the first grounding face 171, and connects the second auxiliary feed-in portion 140.

The third primary monopole antenna 151 further includes a fifth microstrip line 152, the fifth microstrip line 152 extends outwardly from the third primary monopole antenna 151, enters into the second grounding face 172 and is spaced apart from the second grounding face 172, and connects the third primary feed-in portion 150. The third auxiliary monopole antenna 161 further includes a sixth microstrip line 162, the sixth microstrip line 162 extends outwardly from the third auxiliary monopole antenna 161, enters into the third grounding face 173 and is spaced apart from the third grounding face 173, and connects the third auxiliary feed-in portion 160.

The circuit board 1 of the present embodiment is a printed circuit board, the dielectric substrate 100 is a polytetrafluoroethylene substrate, the first primary antenna 11, the first auxiliary antenna 12, the second primary antenna 13, the second auxiliary antenna 14, the third primary antenna 15, the third auxiliary antenna 16, the grounding unit 17 and the first to sixth microstrip lines 113, 123, 132, 142, 152, 162 are patterns which are respectively formed from copper foils printed on the first face 101 and the second face 102 of the dielectric substrate 100 and have specific shapes.

Therefore, the first primary monopole antenna 111 (including the first microstrip line 113) the first primary parasitic antenna 112 and the first grounding face 171 cooperatively act to constitute a LTE/5G wide frequency band primary antenna which operates at the first frequency range, the first auxiliary monopole antenna 121 (including the second microstrip line 123), the first auxiliary parasitic antenna 122 and the first grounding face 171 cooperatively act to constitute a LTE/5G wide frequency band auxiliary antenna which operates at the first frequency range; the second primary monopole antenna 131 (including the third microstrip line 132) and the first grounding face 171 cooperatively act to constitute a WiFi wide frequency band primary antenna which operates at the second frequency range, the second auxiliary monopole antenna 141 (including the fourth microstrip line 142) and the first grounding face 171 cooperatively act to constitute a WiFi wide frequency band auxiliary antenna which operates at the second frequency range; the third primary monopole antenna 151 (including the fifth microstrip line 152) and the second grounding face 172 cooperatively act to constitute a 5G wide frequency band primary antenna which operates at the third frequency range, the third auxiliary monopole antenna 161 (including the sixth microstrip line 162) and the third grounding face 173 cooperatively act to constitute a 5G wide frequency band auxiliary antenna which operates at the third frequency range. Here, the first frequency range contains 600-960 MHz, 1400-1550 MHz, 1710-2690 MHz, 3300-4200 MHz and 4400-5000 MHz; the second frequency range contains 2400-2485 MHz, 5150-5850 MHz and 5925-7125 MHz; the third frequency range contains 1400-1550 MHz, 1710-2690 MHz, 3300-4200 MHz and 4400-5000 MHz.

Moreover, the first grounding face 171 and the first extending ground face 174 are further formed therebetween with: a plurality of conductive through-holes 177 which surround the first primary feed-in portion 110, extend along two sides of the first microstrip line 113 and electrically connect the first grounding face 171 and the first extending ground face 174, a plurality of conductive through-holes 177 which surround the first auxiliary feed-in portion 120, extend along two sides of the second microstrip line 123 and electrically connect the first grounding face 171 and the first extending ground face 174, a plurality of conductive through-holes 177 which surround the second primary feed-in portion 130, extend along two sides of the third microstrip line 132 and electrically connect the first grounding face 171 and the first extending ground face 174, and a plurality of conductive through-holes 177 which surround the second auxiliary feed-in portion 140, extend along two sides of the fourth microstrip line 142 and electrically connect the first grounding face 171 and the first extending ground face 174; and the second grounding face 172 and the second extending ground face 175 are formed therebetween with a plurality of conductive through-holes 177 which surround the third primary feed-in portion 150, extend along two sides of the fifth microstrip line 152 and electrically connect the second grounding face 172 and the second extending ground face 175; the third grounding face 173 and the third extending ground face 176 are formed therebetween with a plurality of conductive through-holes 177 which surround the third auxiliary feed-in portion 160, extend along two sides of the sixth microstrip line 162 and electrically connect the third grounding face 173 and the third extending ground face 176. And, by that the conductive through-holes 177 isolate the feed-in portions 110, 120, 130, 140, 150, 160 from the corresponding the grounding portions 1712, 1714, 1716, 1718, 1722, 1732 and extend at the two sides of the respective microstrip line 113, 123, 132, 142, 152, 162, it may assure that an impedance of each of the microstrip lines maintains 50 Ohm and prevent electromagnetic (EMC) interference.

In addition, as shown in FIG. 2, the first extending ground face 174 is provided therein with a first primary ground soldering pad 1742, a first auxiliary ground soldering pad 1744, a second primary ground soldering pad 1746 and a second auxiliary ground soldering pad 1748; and the second face 102 is provided thereon with a first primary feed-in soldering pad 181 which is adjacent to the first primary ground soldering pad 1742, is surrounded by the first extending ground face 174 and is spaced apart from the first extending ground face 174, the second face 102 is provided thereon with a first auxiliary feed-in soldering pad 182 which is adjacent to the first auxiliary ground soldering pad 1744, is surrounded by the first extending ground face 174 and is spaced apart from the first extending ground face 174, and the second face 102 is provided thereon with a second primary feed-in soldering pad 183 which is adjacent to the second primary ground soldering pad 1746, is surrounded by the first extending ground face 174 and is spaced apart from the first extending ground face 174, and the second face 102 is provided thereon with a second auxiliary feed-in soldering pad 184 which is adjacent to the second auxiliary ground soldering pad 1748, is surrounded by the first extending ground face 174 and is spaced apart from the first extending ground face 174; here, the first primary feed-in soldering pad 181 and the first primary feed-in portion 110 correspond to each other and the first primary feed-in soldering pad 181 and the first primary feed-in portion 110 are formed therebetween with a plurality of conductive through-holes 178 which electrically connect the first primary feed-in soldering pad 181 and the first primary feed-in portion 110, the first primary ground soldering pad 1742 and the first primary grounding portion 1712 correspond to each other and the first primary ground soldering pad 1742 and the first primary grounding portion 1712 are formed therebetween with a plurality of conductive through-holes 178 which electrically connect the first primary ground soldering pad 1742 and the first primary grounding portion 1712; the first auxiliary feed-in soldering pad 182 and the first auxiliary feed-in portion 120 correspond to each other and the first auxiliary feed-in soldering pad 182 and the first auxiliary feed-in portion 120 are formed therebetween with a plurality of conductive through-holes 178 which electrically connect the first auxiliary feed-in soldering pad 182 and the first auxiliary feed-in portion 120, the first auxiliary ground soldering pad 1744 and the first auxiliary grounding portion 1714 correspond to each other and the first auxiliary ground soldering pad 1744 and the first auxiliary grounding portion 1714 are formed therebetween with a plurality of conductive through-holes 178 which electrically connect the first auxiliary ground soldering pad 1744 and the first auxiliary grounding portion 1714; the second primary feed-in soldering pad 183 and the second primary feed-in portion 130 correspond to each other and are formed therebetween with a plurality of conductive through-holes 178 which electrically connect the second primary feed-in soldering pad 183 and the second primary feed-in portion 130, the second primary ground soldering pad 1746 and the second primary grounding portion 1716 correspond to each other and the second primary ground soldering pad 1746 and the second primary grounding portion 1716 are formed therebetween with a plurality of conductive through-holes 178 which electrically connect the second primary ground soldering pad 1746 and the second primary grounding portion 1716; the second auxiliary feed-in soldering pad 184 and the second auxiliary feed-in portion 140 correspond to each other and the second auxiliary feed-in soldering pad 184 and the second auxiliary feed-in portion 140 are formed therebetween with a plurality of conductive through-holes 178 which electrically connect the second auxiliary feed-in soldering pad 184 and the second auxiliary feed-in portion 140, the second auxiliary ground soldering pad 1748 and the second auxiliary grounding portion 1718 correspond to each other and the second auxiliary ground soldering pad 1748 and the second auxiliary grounding portion 1718 are formed therebetween with a plurality of conductive through-holes 178 which electrically connect the second auxiliary ground soldering pad 1748 and the second auxiliary grounding portion 1718.

And as shown in FIG. 2, the second extending ground face 175 is provided therein with a third primary ground soldering pad 1752, and the second face 102 is provided thereon with a third primary feed-in soldering pad 185 which is adjacent to the third primary ground soldering pad 1752, is surrounded by the second extending ground face 175 and is spaced apart from the second extending ground face 175, and the third extending ground face 176 is provided therein with a third auxiliary ground soldering pad 1762, and the second face 102 is provided thereon with a third auxiliary feed-in soldering pad 186 which is adjacent to the third auxiliary ground soldering pad 1762, is surrounded by the third extending ground face 176 and is spaced apart from the third extending ground face 176; here, the third primary feed-in soldering pad 185 and the third primary feed-in portion 150 correspond to each other and the third primary feed-in soldering pad 185 and the third primary feed-in portion 150 are formed therebetween with a plurality of conductive through-holes 178 which electrically connect the third primary feed-in soldering pad 185 and the third primary feed-in portion 150, the third primary ground soldering pad 1752 and the third primary grounding portion 1722 correspond to each other and the third primary ground soldering pad 1752 and the third primary grounding portion 1722 are formed therebetween with a plurality of conductive through-holes 178 which electrically connect the third primary ground soldering pad 1752 and the third primary grounding portion 1722; the third auxiliary feed-in soldering pad 186 and the third auxiliary feed-in portion 160 correspond to each other and the third auxiliary feed-in soldering pad 186 and the third auxiliary feed-in portion 160 are formed therebetween with a plurality of conductive through-holes 178 which electrically connect the third auxiliary feed-in soldering pad 186 and the third auxiliary feed-in portion 160, the third auxiliary ground soldering pad 1762 and the third auxiliary grounding portion 1732 correspond to each other and the third auxiliary ground soldering pad 1762 and the third auxiliary grounding portion 1732 are formed therebetween with a plurality of conductive through-holes 178 which electrically connect the third auxiliary ground soldering pad 1762 and the third auxiliary grounding portion 1732.

Figure 3:
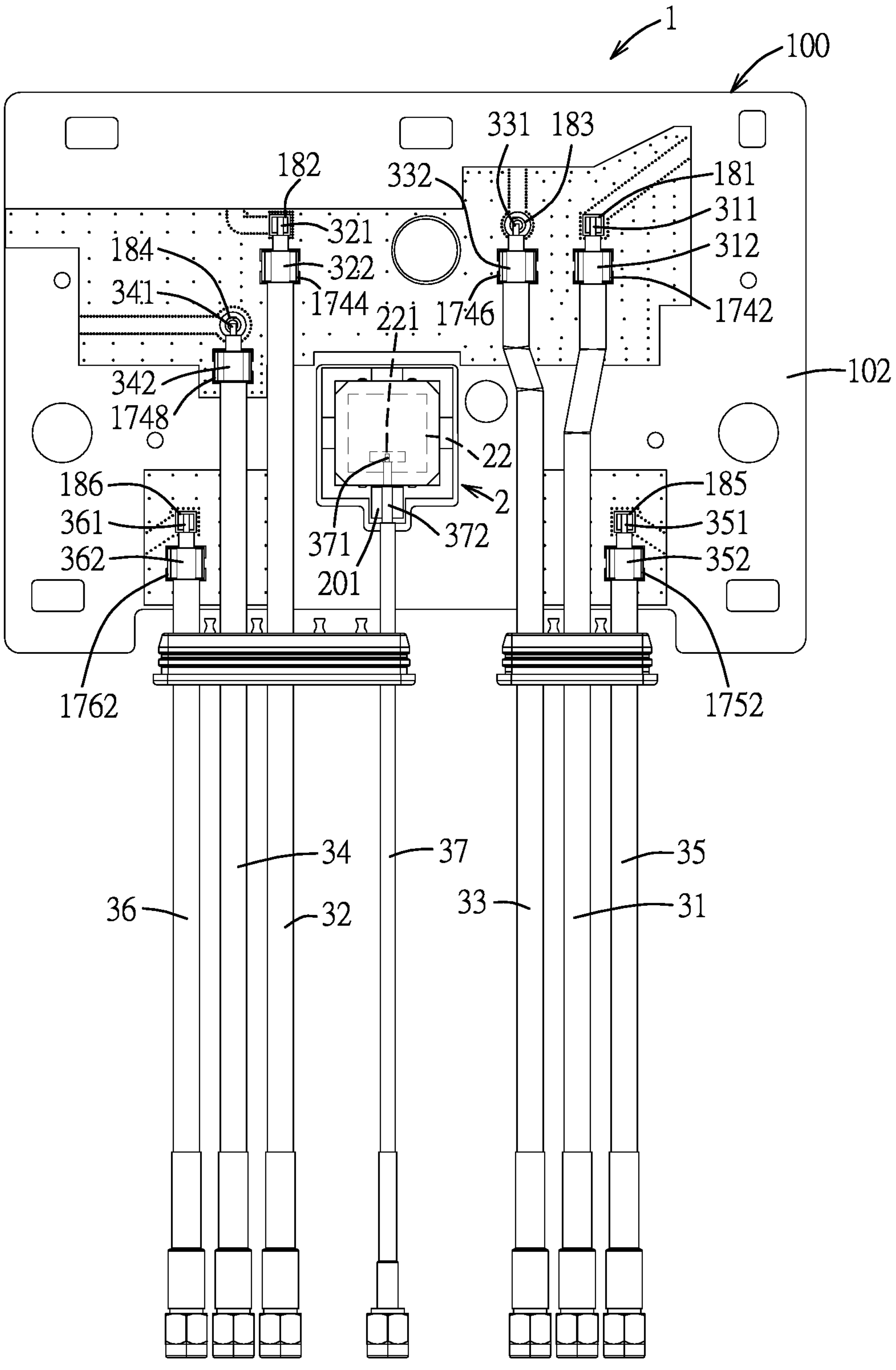
FIG. 3 is a schematic view of connection of the second face of the circuit board of the present embodiment with multiple radio frequency transmitting lines.

And as shown in FIG. 3, the first primary feed-in soldering pad 181 is used to be soldered with an inner conductor 311 of a first radio frequency transmitting line 31, the first primary ground soldering pad 1742 is used to be soldered with an outer conductor 312 of the first radio frequency transmitting line 31 which is insulated from the inner conductor 311, so as to feed a radio frequency signal to enter into/exit from the first radio frequency transmitting line 31; the first auxiliary feed-in soldering pad 182 is used to be soldered with an inner conductor 321 of a second radio frequency transmitting line 32, the first auxiliary ground soldering pad 1744 is used to be soldered with an outer conductor 322 of the second radio frequency transmitting line 32 which is insulated from the inner conductor 321, so as to feed a radio frequency signal to enter into/exit from the second radio frequency transmitting line 32; the second primary feed-in soldering pad 183 is used to be soldered with an inner conductor 331 of a third radio frequency transmitting line 33, the second primary ground soldering pad 1746 is used to be soldered with an outer conductor 332 of the third radio frequency transmitting line 33 which is insulated from the inner conductor 331, so as to feed a radio frequency signal to enter into/exit from the third radio frequency transmitting line 33; the second auxiliary feed-in soldering pad 184 is used to be soldered with an inner conductor 341 of a fourth radio frequency transmitting line 34, the second auxiliary ground soldering pad 1748 is used to be soldered with an outer conductor 342 of the fourth radio frequency transmitting line 34 which is insulated from the inner conductor 341, so as to feed a radio frequency signal to enter into/exit from the fourth radio frequency transmitting line 34; the third primary feed-in soldering pad 185 is used to be soldered with an inner conductor 351 of a fifth radio frequency transmitting line 35, the third primary ground soldering pad 1752 is used to be soldered with an outer conductor 352 of the fifth radio frequency transmitting line 35 which is insulated from the inner conductor 351, so as to feed a radio frequency signal to enter into/exit from the fifth radio frequency transmitting line 35; the third auxiliary feed-in soldering pad 186 is used to be soldered with an inner conductor 361 of a sixth radio frequency transmitting line 36, the third auxiliary ground soldering pad 1762 is used to be soldered with an outer conductor 362 of the sixth radio frequency transmitting line 36 which is insulated from the inner conductor 361, so as to feed a radio frequency signal to enter into/exit from the sixth radio frequency transmitting line 36. Therefore, by that the first to sixth radio frequency transmitting lines 31-36 all are collected on the second face 102 of the circuit board 1, it may avoid the first-sixth radio frequency transmitting lines 31-36 interfering the antennas which are formed on the first face 101.

And, by that the first grounding face 171 spaces the first primary antenna 11 apart from the first auxiliary antenna 12, the first primary antenna 11 and the first auxiliary antenna 12 can independently operate respectively and are held by a certain distance to be efficiently isolated from each other, thereby assuring that the first primary antenna 11 and the first auxiliary antenna 12 have good isolation degree in the first frequency range; and, by that the first grounding face 171 spaces the second primary antenna 13 apart from the second auxiliary antenna 14, the second primary antenna 13 and the second auxiliary antenna 14 can independently operate respectively and held by a certain distance to be efficiently isolated from each other, thereby assuring that the second primary antenna 13 and the second auxiliary antenna 14 have good isolation degree in the second frequency range. Moreover, by that third primary antenna 15 and third auxiliary antenna 16 respectively operate independently from each other and are completely isolated from each other and are held a certain distance, and the third primary antenna 15, the third auxiliary antenna 16 and the first primary antenna 11, the first auxiliary antenna 12, the second primary antenna 13 and the second auxiliary antenna 14 respectively operate independently from each other and are completely isolated from each other and are held a certain distance, and the first grounding face 171, the second grounding face 172 and the third grounding face 173 are not connected with each other, so that isolation degree between the third primary antenna 15 and the third auxiliary antenna 16 is promoted, and isolation degree between the third primary antenna 15, the third auxiliary antenna 16 and the first primary antenna 11, the first auxiliary antenna 12, the second primary antenna 13 and the second auxiliary antenna 14.

Figure 4:
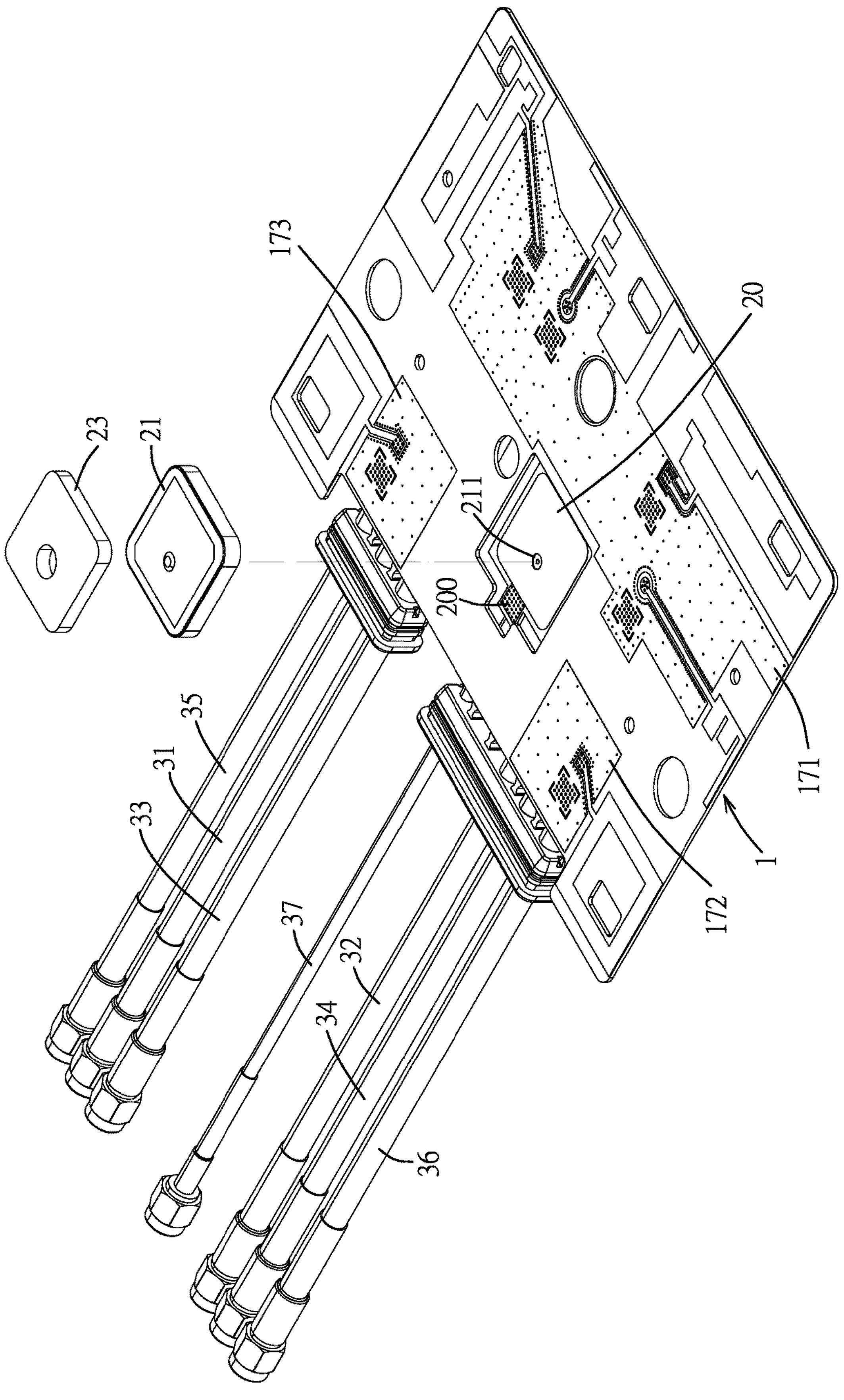
FIG. 4 is a provision schematic view of a ceramic dielectric antenna of a GNSS antenna of the present embodiment.
Figure 5:
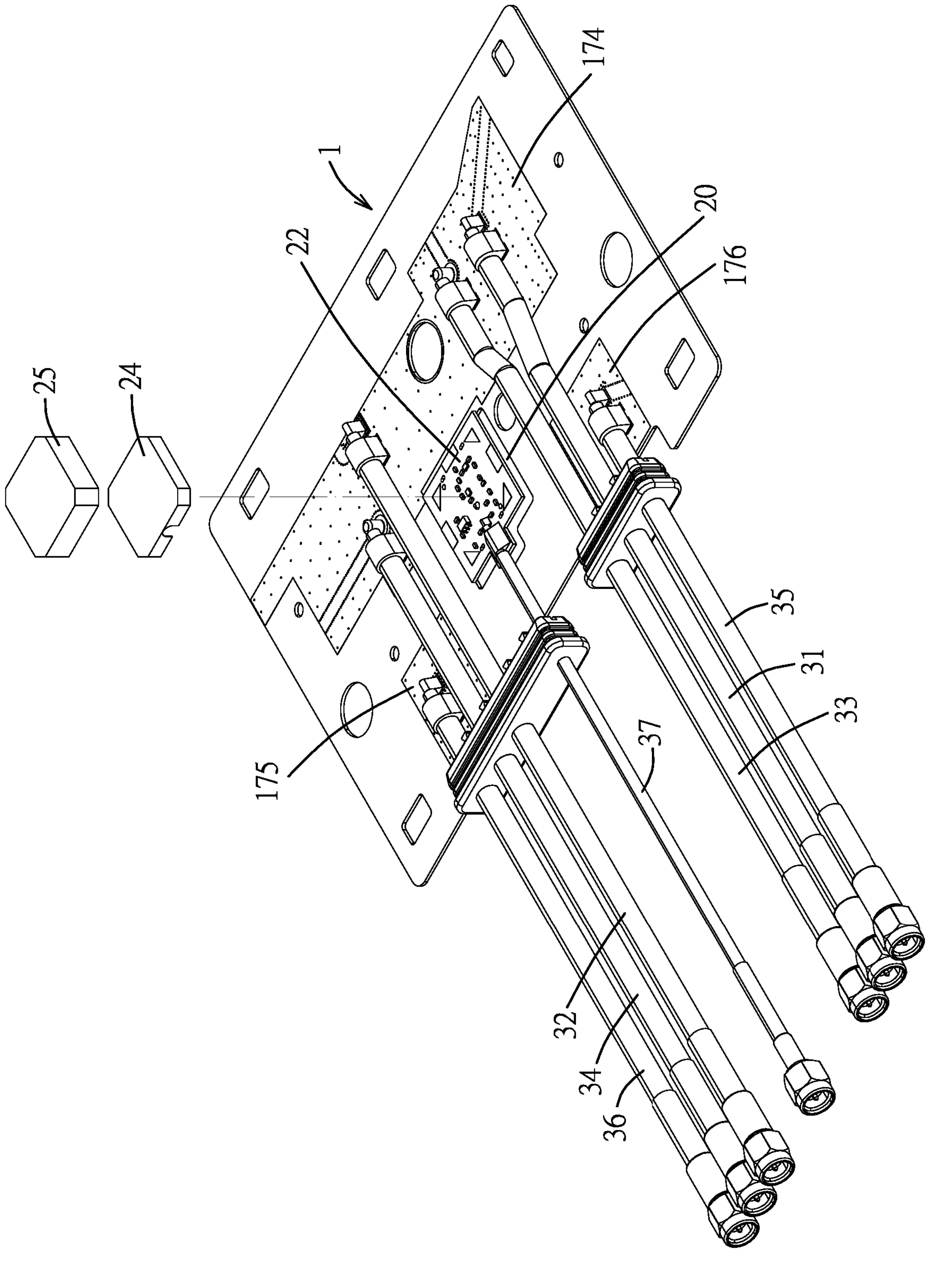
FIG. 5 is a provision schematic view of a low-noise amplifying circuit of the GNSS antenna of the present embodiment.
Figure 6:
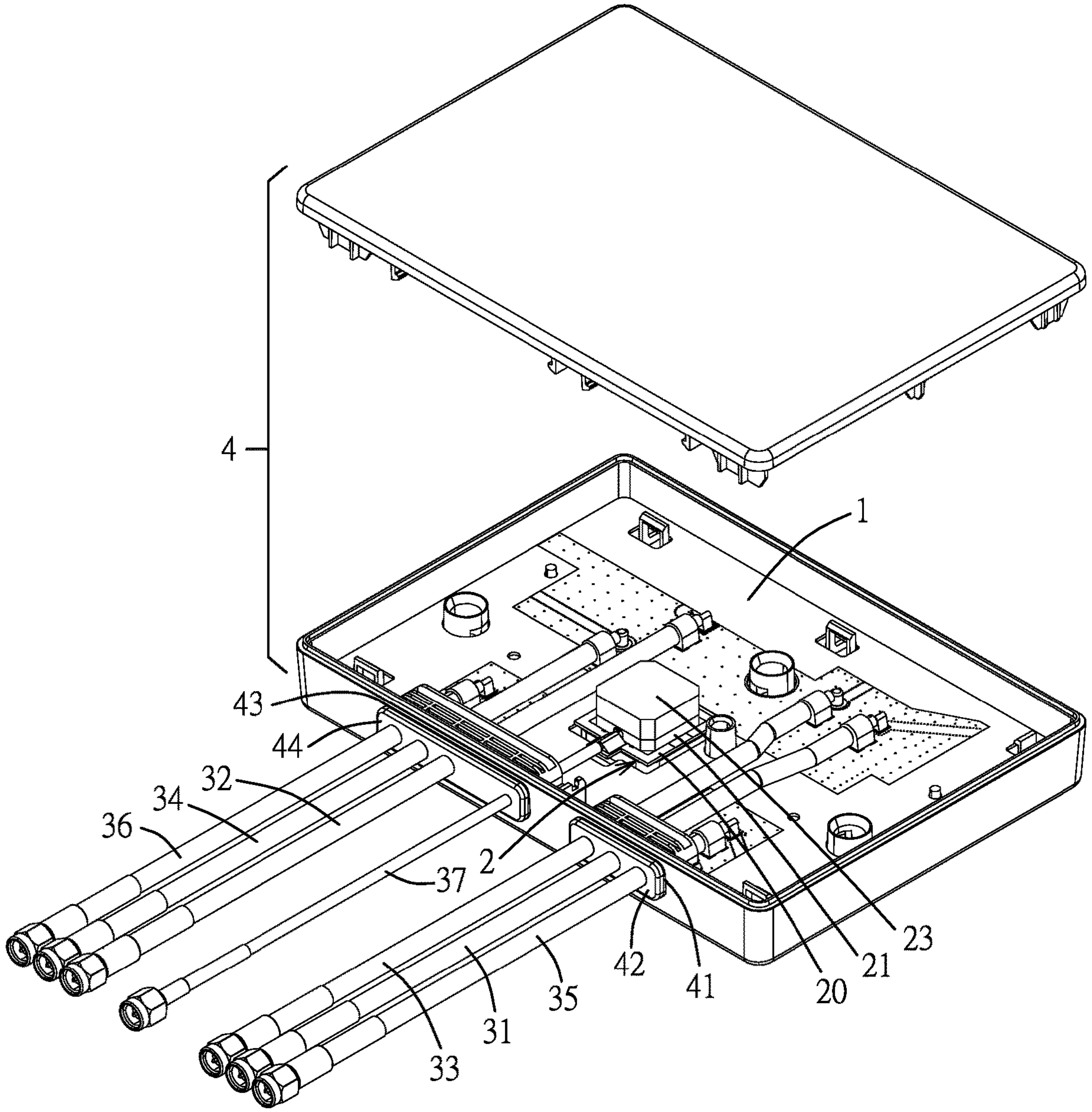
FIG. 6 is a schematic view of the circuit board of the present embodiment accommodated in an outer casing.
Figure 7:
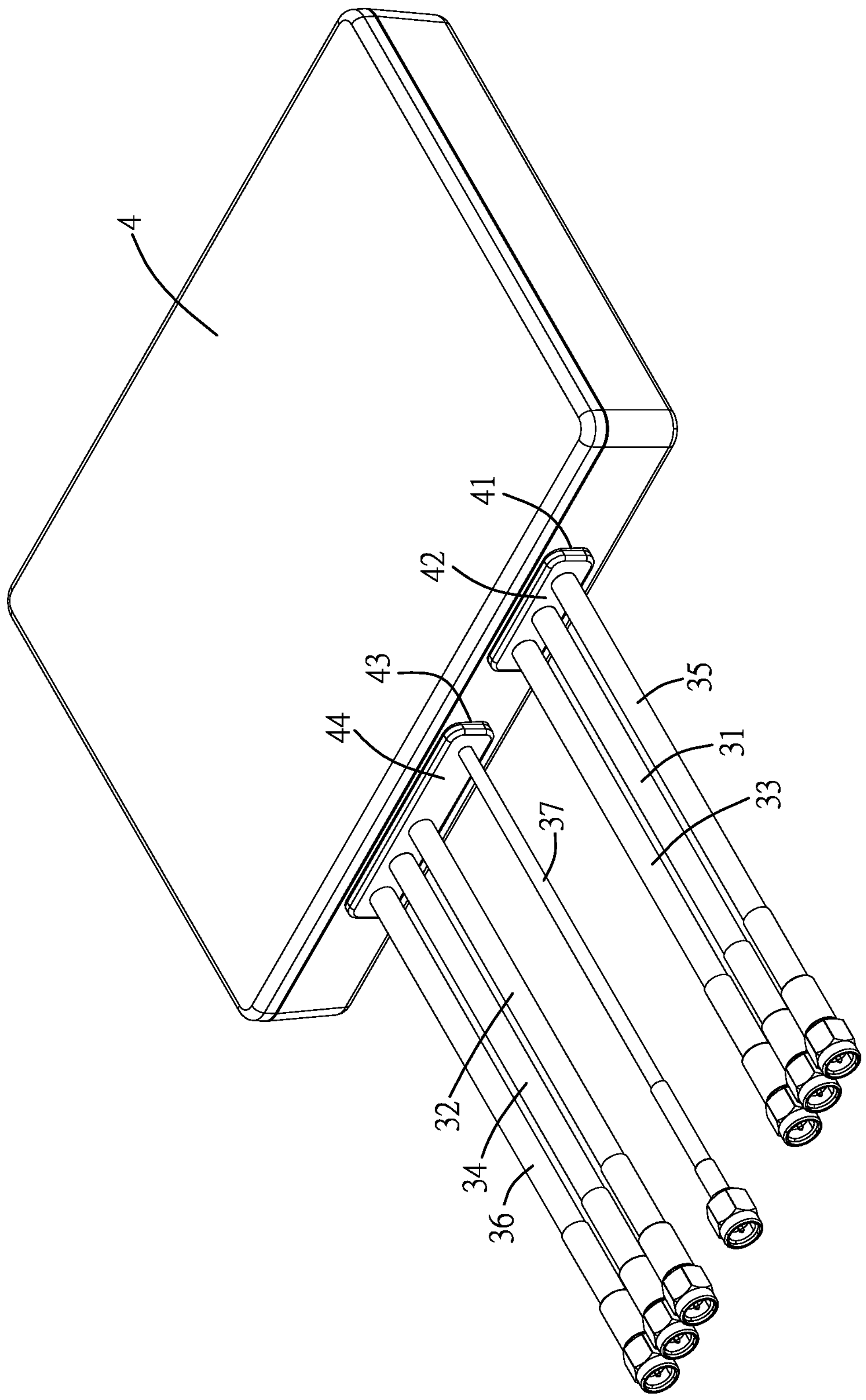
FIG. 7 is a schematic view of the circuit board of the present embodiment after sealed by the outer casing of FIG. 4.

Moreover, as shown in FIG. 1 to FIG. 5, the present embodiment further includes a global navigation satellite system (GNSS) antenna 2 which may be separately fixed on the circuit board 1, because the GNSS antenna 2 has elements, such as a resistor, an inductor and the like, therein, if the GNSS antenna 2 is directly made on the circuit board 1, fabricating cost is higher, so, in order to lower the fabricating cost, the global navigation satellite system antenna 2 includes a daughter circuit board 20, a ceramic dielectric antenna 21 operating at a fourth frequency range and a low-noise amplifying circuit 22, the ceramic dielectric antenna 21 is provided on a face of the daughter circuit board 20 and is positioned among the first grounding face 171, the second grounding face 172 and the third grounding face 173 of the circuit board 1, the face of the daughter circuit board 20 is provided with a grounding portion 200, and as shown in FIG. 4 and FIG. 6, the ceramic dielectric antenna 21 is provided above with a foam 23 which has a protecting and buffering function; the low-noise amplifying circuit 22 is provided on another face of the daughter circuit board 20 and is positioned among the first extending ground face 174, the second extending ground face 175 and the third extending ground face 176 of the circuit board 1, and as shown in FIG. 5, the low-noise amplifying circuit 22 is provided above with a metal cage 24 which covers the low-noise amplifying circuit 22 and blocks electromagnetic wave and a foam 25 which has a protecting and buffering function; and the ceramic dielectric antenna 21 is electrically connected with the low-noise amplifying circuit 22 via a feeding pin 211 which passes through the daughter circuit board 20. And as shown in FIG. 3, a feed-in end 221 of the low-noise amplifying circuit 22 may allow an inner conductor 371 of a seventh radio frequency transmitting line 37 to be electrically connected therewith, and an outer conductor 372 of the seventh radio frequency transmitting line 37 which is insulated from the inner conductor 371 is electrically connected with a ground soldering pad 201 which is formed on the daughter circuit board 20, is electrically connected with the grounding portion 200 and is provided on the another face of the daughter circuit board 20, so as to feed a radio frequency signal which is received by the ceramic dielectric antenna 21 and is amplified by the low-noise amplifying circuit 22 to the seventh radio frequency transmitting line 37. Here, the fourth frequency range contains 1555-1610 MHz. It is noted that, the low-noise amplifying circuit 22 is not an essential element, also may be omitted as practical application circumstance or requirement. Certainly, in other implementing manners, the GNSS antenna 2 may be also directly provided in the circuit board 1, that is, the daughter circuit board 20 is integrated into the circuit board 1, then the ceramic dielectric antenna 21 and the grounding portion 200 are provided on the first face 101 of the dielectric substrate 100, the low-noise amplifying circuit 22 and the ground soldering pad 201 are provided on the second face 102 of the dielectric substrate 100, and the ceramic dielectric antenna 21 is electrically connected with the low-noise amplifying circuit 22 via the feeding pin 211 which passes through the dielectric substrate 100.

Moreover, as shown in FIG. 3 to FIG. 7, the antenna device of the present embodiment further includes an outer casing 4 which accommodates the circuit board 1, a first elastic filler 42 which is filled in a first opening 41 of the outer casing 4 and a second elastic filler 44 which is filled in a second opening 43 of the outer casing 4, the first, third and fifth radio frequency transmitting lines 31, 33, 35 enter into the outer casing 4 via the first opening 41, and the first elastic filler 42 allows the first, third and fifth radio frequency transmitting lines 31, 33, 35 to pass through, so as to fix the first, third and fifth radio frequency transmitting lines 31, 33, 35 on the outer casing 4; the second, fourth, sixth and seventh radio frequency transmitting lines 32, 34, 36, 37 enter into the outer casing 4 via the second opening 43, and the second elastic filler 44 allows the second, fourth, sixth and seventh radio frequency transmitting lines 32, 34, 36, 37 to pass through, so as to fix the second, fourth, sixth and seventh radio frequency transmitting lines 32, 34, 36, 37 on the outer casing 4. A material of the outer casing 4 may be polycarbonate (PC) or thermal plastic synthetic polymer resin (ABS), and an external dimension of the outer casing 4 is 160 millimeter×115 millimeter×22.5 millimeter, as may be seen from this, a dimension of the antenna device of the present embodiment is less than 160 millimeter×115 millimeter×22.5 millimeter.

Figure 8:
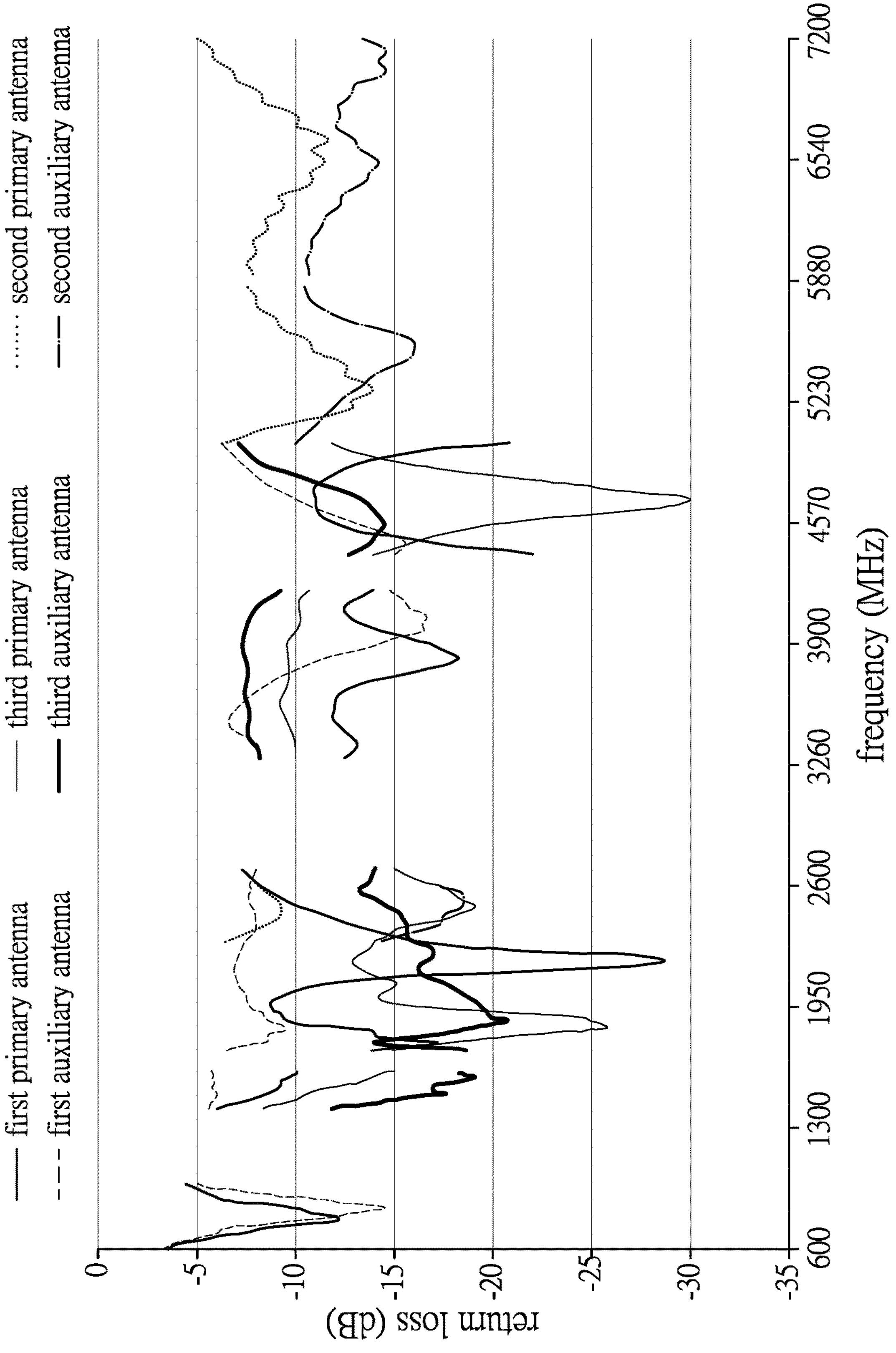
FIG. 8 shows return loss data of respective antennas of the present embodiment at operating frequency bands thereof.
Figure 9:
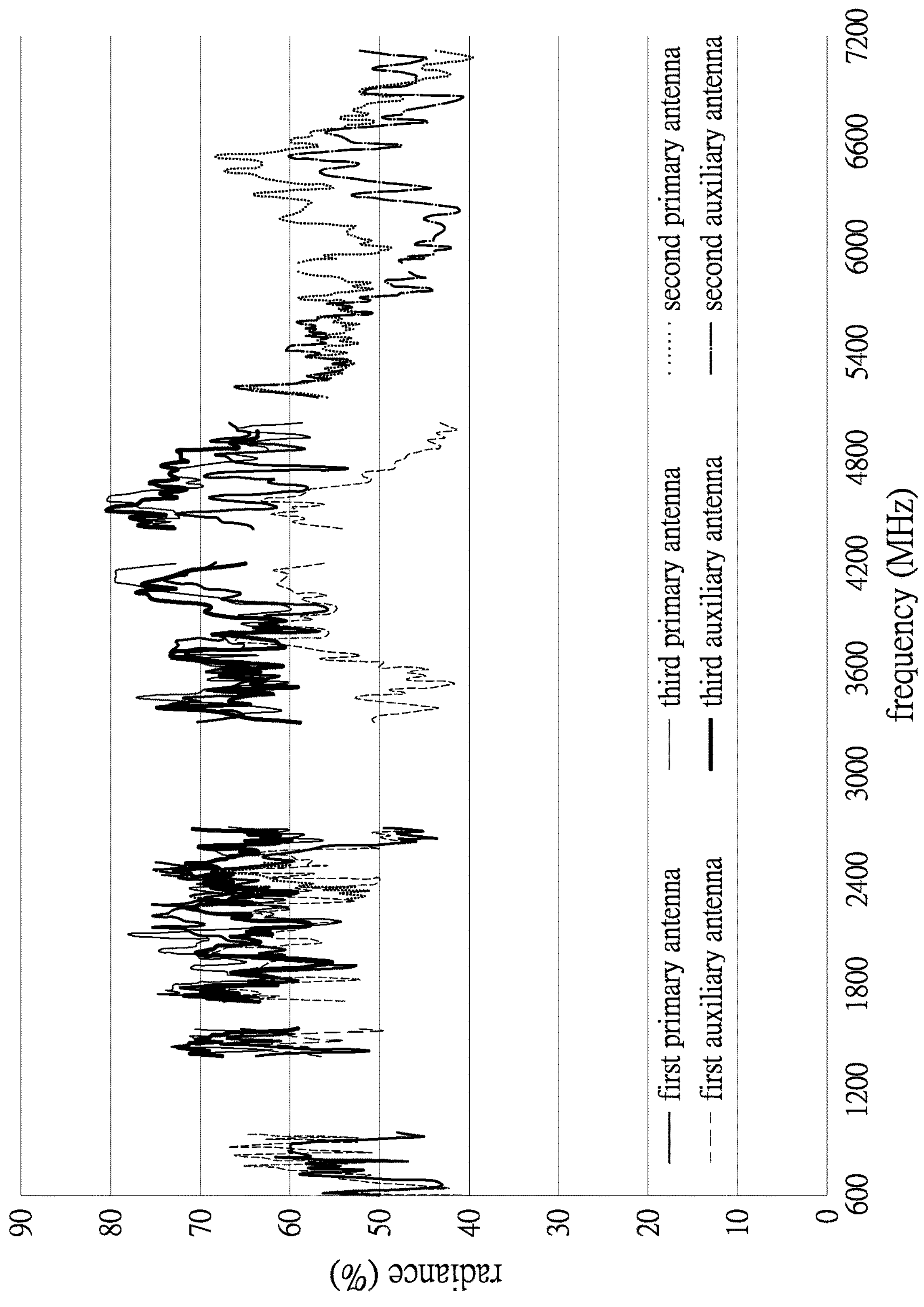
FIG. 9 shows radiating efficacy data of the respective antennas of the present embodiment at the operating frequency band thereof.
Figure 10:
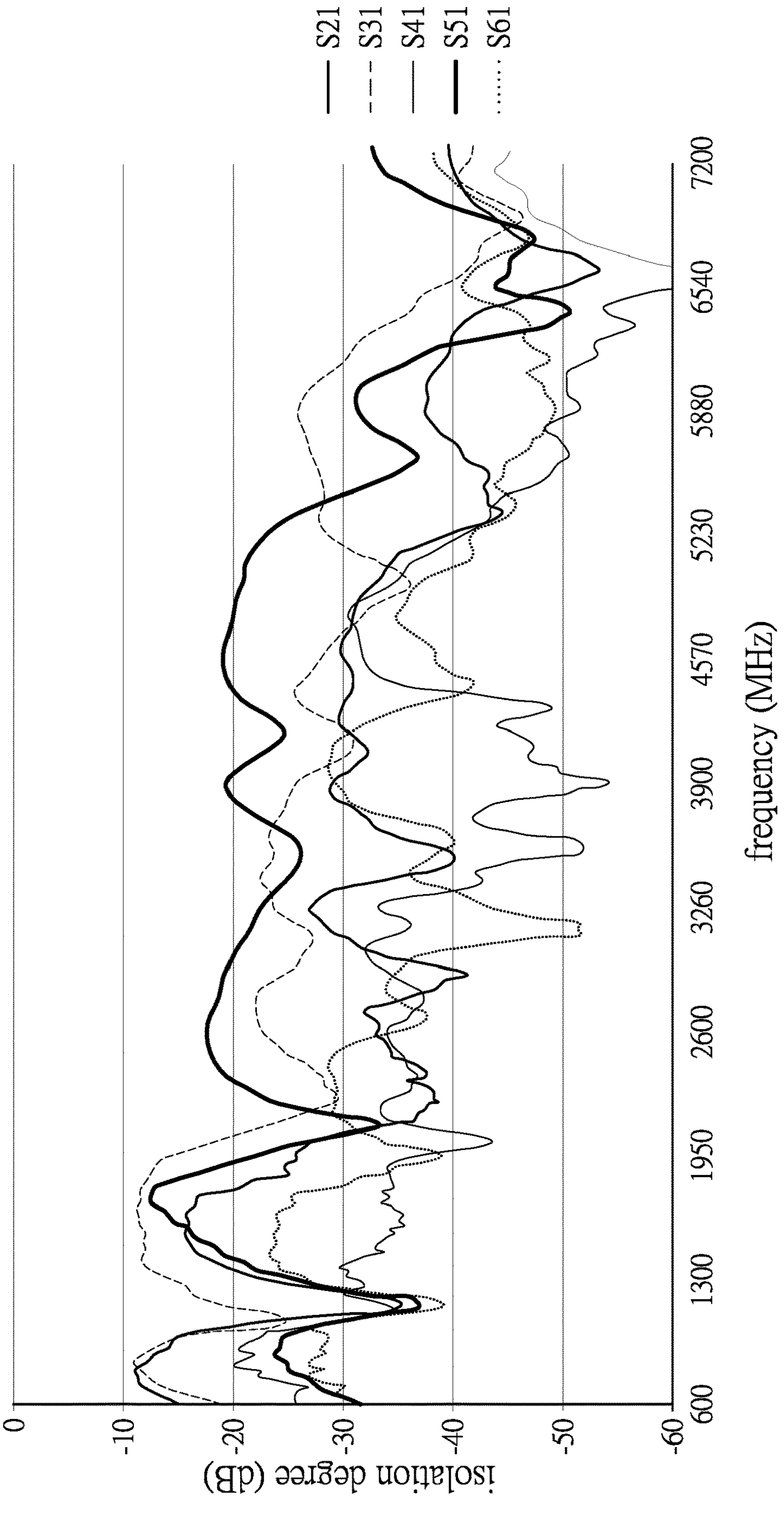
FIG. 10 to FIG. 12 show isolation degree data between the antennas of the present embodiment.
Figure 11:
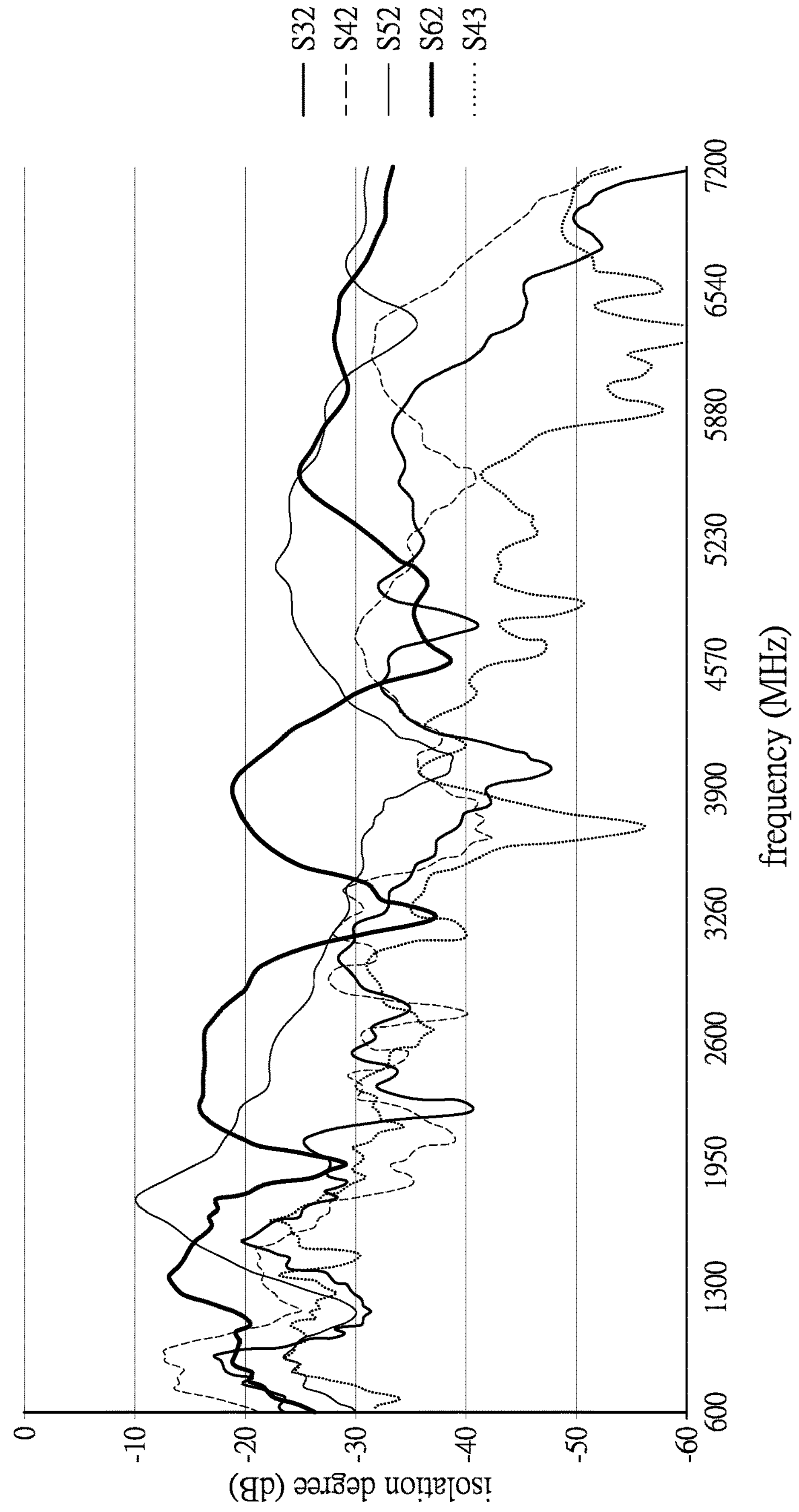
Figure 12:
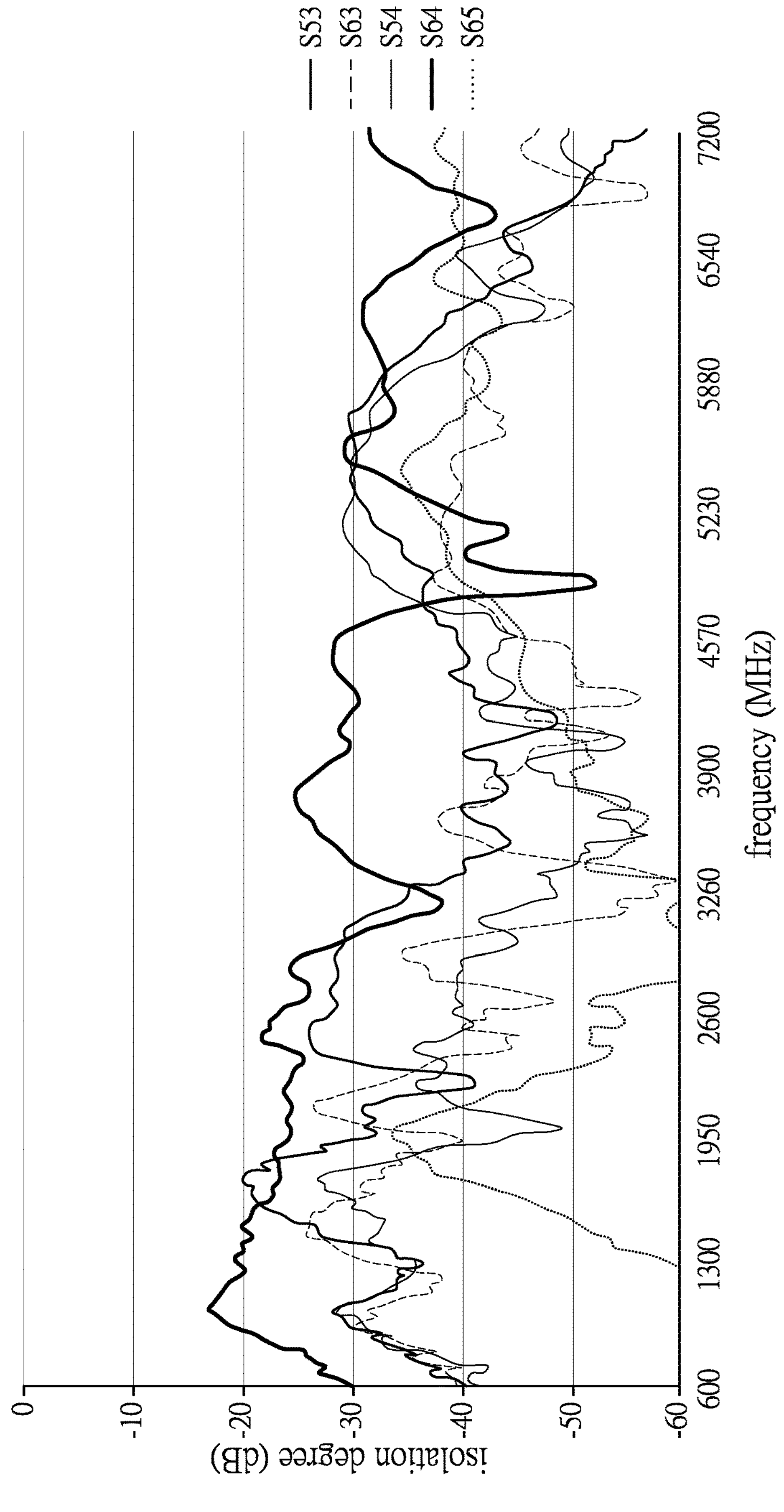

Additionally referring to FIG. 8, it may be seen that, return losses of the first primary antenna 11, the first auxiliary antenna 12, the second primary antenna 13, the second auxiliary antenna 14, the third primary antenna 15 and the third auxiliary antenna 16 of the present embodiment at the operating frequency bands thereof all are less than −5 dB, and referring to FIG. 9, it may be seen that, radiances of the first primary antenna 11, the first auxiliary antenna 12, the second primary antenna 13, the second auxiliary antenna 14, the third primary antenna 15 and the third auxiliary antenna 16 at the operating frequency bands thereof most exceed 50%, it indicate that the radiating efficacy is good; moreover, referring to FIG. 10, it may be seen that, an isolation degree S21 between the first primary antenna 11 and the first auxiliary antenna 12, an isolation degree S31 between the first primary antenna 11 and the second primary antenna 13, an isolation degree S41 between the first primary antenna 11 and the second auxiliary antenna 14, an isolation degree S51 between the first primary antenna 11 and the third primary antenna 15 and the isolation degree S61 between the first primary antenna 11 and the third auxiliary antenna 16 all are less than −10 dB; and as shown in FIG. 11, an isolation degree S32 between the first auxiliary antenna 12 and the second primary antenna 13, an isolation degree S42 between the first auxiliary antenna 12 and the second auxiliary antenna 14, an isolation degree S52 between the first auxiliary antenna 12 and the third primary antenna 15, an isolation degree S62 between the first auxiliary antenna 12 and the third auxiliary antenna 16, an isolation degree S43 between the second primary antenna 13 and the second auxiliary antenna 14 all are less than −10 dB; and as shown in FIG. 12, an isolation degree S53 between the second primary antenna 13 and the third primary antenna 15, an isolation degree S63 between the second primary antenna 13 and the third auxiliary antenna 16, an isolation degree S54 between the second auxiliary antenna 14 and the third primary antenna 15, an isolation degree S64 between the second auxiliary antenna 14 and the third auxiliary antenna 16 and the isolation degree S65 between the third primary antenna 15 and the third auxiliary antenna 16 almost are less than −20 dB, this indicates that the antennas definitely have good isolation degree therebetween.

It is noted that, in other implementing manners, the first to sixth microstrip lines 113, 123, 132, 142, 152, 162 also may be omitted, and the feed-in portions 110, 120, 130, 140, 150, 160 are directly provided on the corresponding the antennas 11, 12, 13, 14, 15, 16 respectively; or, that the present embodiment only employs the first face 101 of the dielectric substrate 100 also may realize the technology of the present disclosure, that is, the second face 102 of the dielectric substrate 100 is not employed, but directly, the inner conductor 311 and the outer conductor 312 of the first radio frequency transmitting line 31 are soldered to the first primary feed-in portion 110 and the first primary grounding portion 1712 respectively, the inner conductor 321 and the outer conductor 322 of the second radio frequency transmitting line 32 are soldered to the first auxiliary feed-in portion 120 and the first auxiliary grounding portion 1714 respectively, the inner conductor 331 and the outer conductor 332 of the third radio frequency transmitting line 33 are soldered to the second primary feed-in portion 130 and the second primary grounding portion 1716 respectively, the inner conductor 341 and the outer conductor 342 of the fourth radio frequency transmitting line 34 are soldered to the second auxiliary feed-in portion 140 and the second auxiliary grounding portion 1718 respectively, the inner conductor 351 and the outer conductor 352 of the fifth radio frequency transmitting line 35 are soldered to the third primary feed-in portion 150 and the third primary grounding portion 1722 respectively, and the inner conductor 361 and the outer conductor 362 of the sixth radio frequency transmitting line 36 are soldered to the third auxiliary feed-in portion 160 and the third auxiliary grounding portion 1732 respectively. Moreover, the inner conductor 371 and the outer conductor 372 of the seventh radio frequency transmitting line 37 also may be electrically connected with the feeding pin 211 and the grounding portion 200 respectively.

In conclusion, the above embodiment integrates various types of antennas on the circuit board which is single and has a small dimension, and by the first grounding face 171, the second grounding face 172 and the third grounding face 173 which are not connected with each other, in addition to that each antenna is held good radiation performance, the antennas further have good isolation degree therebetween, which solves the problem that the traditional multiple-in-one antenna cannot meet small dimension, multiple frequency band operation and high isolation degree (<−10 dB) at the same time, and definitely attains the effect and the object of the present disclosure.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An antenna device, comprising:

a circuit board which comprises:

a dielectric substrate which has a first face;

a first primary antenna and a first auxiliary antenna which operate at a first frequency range, are provided on the first face of the dielectric substrate respectively and are isolated from each other;

a second primary antenna and a second auxiliary antenna which operate at a second frequency range, are provided on the first face of the dielectric substrate respectively and are isolated from each other;

a third primary antenna and a third auxiliary antenna which operate at a third frequency range, are provided on the first face of the dielectric substrate respectively and are isolated from each other; and a grounding unit comprising a first grounding face, a second grounding face and a third grounding face which are provided on the first face of the dielectric substrate and are isolated from each other, the first grounding face being positioned between the first primary antenna and the first auxiliary antenna to space the first primary antenna apart from the first auxiliary antenna, the first grounding face, the first primary antenna and the first auxiliary antenna cooperatively acting, and the first grounding face being positioned between the second primary antenna and the second auxiliary antenna to space the second primary antenna apart from the second auxiliary antenna, the first grounding face, the second primary antenna and the second auxiliary antenna cooperatively acting, the second grounding face being adjacent to the third primary antenna and the second grounding face and the third primary antenna cooperatively acting, the third grounding face being adjacent to the third auxiliary antenna and the third grounding face and the third auxiliary antenna cooperatively acting.

2. The antenna device of claim 1, wherein the first grounding face is provided with a first primary grounding portion, a first auxiliary grounding portion, a second primary grounding portion and a second auxiliary grounding portion, and the first primary antenna has a first primary feed-in portion which is adjacent to the first primary grounding portion, is surrounded by the first grounding face and is spaced apart from the first grounding face, the first auxiliary antenna has a first auxiliary feed-in portion which is adjacent to the first auxiliary grounding portion, is surrounded by the first grounding face and is spaced apart from the first grounding face, the second primary antenna has a second primary feed-in portion which is adjacent to the second primary grounding portion, is surrounded by the first grounding face and is spaced apart from the first grounding face, the second auxiliary antenna has a second auxiliary feed-in portion which is adjacent to the second auxiliary grounding portion, is surrounded by the first grounding face and is spaced apart from the first grounding face;

the second grounding face is provided with a third primary grounding portion, and the third primary antenna has a third primary feed-in portion which is adjacent to the third primary grounding portion, is surrounded by the second grounding face and is spaced apart from the second grounding face;

the third grounding face is provided with a third auxiliary grounding portion, and the third auxiliary antenna has a third auxiliary feed-in portion which is adjacent to the third auxiliary grounding portion, is surrounded by the third grounding face and is spaced apart from the third grounding face.

3. The antenna device of claim 1, wherein the dielectric substrate has a first side edge and a second side edge which are opposite to each other and a third side edge and a fourth side edge which are connected with the first side edge and the second side edge and are opposite to each other, the first side edge, the second side edge, the third side edge and the fourth side edge define a periphery of the dielectric substrate; the first primary antenna is positioned in a corner which is surrounded by the first side edge and the third side edge, the first auxiliary antenna is positioned in a corner which is surrounded by the first side edge and the fourth side edge, the second primary antenna is adjacent to the first side edge and is positioned between the first primary antenna and the first auxiliary antenna, the second auxiliary antenna is adjacent to the fourth side edge and is positioned between the first auxiliary antenna and the third auxiliary antenna, the third primary antenna is positioned in a corner which is surrounded by the second side edge and the third side edge, the third auxiliary antenna is positioned in a corner which is surrounded by the second side edge and the fourth side edge.

4. The antenna device of claim 2, wherein the first primary antenna comprises a first primary monopole antenna which is connected with the first primary feed-in portion and a first primary parasitic antenna which extends outwardly from the first grounding face, is spaced apart from the first primary monopole antenna and is adjacent to the first primary monopole antenna to mutually electrically couple; the first auxiliary antenna comprises a first auxiliary monopole antenna which is connected with the first auxiliary feed-in portion and a first auxiliary parasitic antenna which extends outwardly from the first grounding face is spaced apart from and is adjacent to the first auxiliary monopole antenna to mutually electrically couple, the second primary antenna comprises a second primary monopole antenna which is connected with the second primary feed-in portion, the second auxiliary antenna comprises a second auxiliary monopole antenna which is connected with the second auxiliary feed-in portion, the third primary antenna comprises a third primary monopole antenna which is connected with the third primary feed-in portion, the third auxiliary antenna comprises a third auxiliary monopole antenna which is connected with the third auxiliary feed-in portion.

5. The antenna device of claim 4, wherein the first primary monopole antenna further comprises a first microstrip line, the first microstrip line extends outwardly from the first primary monopole antenna, enters into the first grounding face and is spaced apart from the first grounding face, and connects the first primary feed-in portion;

the first auxiliary monopole antenna further comprises a second microstrip line, the second microstrip line extends outwardly from the first auxiliary monopole antenna, enters into the first grounding face and is spaced apart from the first grounding face, and connects the first auxiliary feed-in portion;

the second primary monopole antenna further comprises a third microstrip line, the third microstrip line extends outwardly from the second primary monopole antenna, enters into the first grounding face and is spaced apart from the first grounding face, and connects the second primary feed-in portion;

the second auxiliary monopole antenna further comprises a fourth microstrip line, the fourth microstrip line extends outwardly from the second auxiliary monopole antenna, enters into the first grounding face and is spaced apart from the first grounding face, and connects the second auxiliary feed-in portion;

the third primary monopole antenna further comprises a fifth microstrip line, the fifth microstrip line extends outwardly from the third primary monopole antenna, enters into the second grounding face and is spaced apart from the second grounding face, and connects the third primary feed-in portion;

the third auxiliary monopole antenna further comprises a sixth microstrip line, the sixth microstrip line extends outwardly from the third auxiliary monopole antenna, enters into the third grounding face and is spaced apart from the third grounding face, and connects the third auxiliary feed-in portion.

6. The antenna device of claim 5, wherein the dielectric substrate further has a second face which is opposite to the first face, the grounding unit further comprises a first extending ground face, a second extending ground face and a third extending ground face which are provided on the second face of the dielectric substrate, the first extending ground face and the first grounding face correspond to each other and the first extending ground face and the first grounding face are formed therebetween with a plurality of conductive through-holes which electrically connect the first extending ground face and the first grounding face;

the second extending ground face and the second grounding face correspond to each other and the second extending ground face and the second grounding face are formed therebetween with a plurality of conductive through-holes which electrically connect the second extending ground face and the second grounding face;

the third extending ground face and the third grounding face correspond to each other and the third extending ground face and the third grounding face are formed therebetween with a plurality of conductive through-holes which electrically connect the third extending ground face and the third grounding face.

7. The antenna device of claim 6, wherein the first grounding face and the first extending ground face are formed therebetween with:

a plurality of conductive through-holes which surround the first primary feed-in portion, extend along two sides of the first microstrip line and electrically connect the first grounding face and the first extending ground face, a plurality of conductive through-holes which surround the first auxiliary feed-in portion, extend along two sides of the second microstrip line and electrically connect the first grounding face and the first extending ground face, a plurality of conductive through-holes which surround the second primary feed-in portion, extend along two sides of the third microstrip line and electrically connect the first grounding face and the first extending ground face, and a plurality of conductive through-holes which surround the second auxiliary feed-in portion, extend along two sides of the fourth microstrip line and electrically connect the first grounding face and the first extending ground face;

the second grounding face and the second extending ground face are formed therebetween with a plurality of conductive through-holes which surround the third primary feed-in portion, extend along two sides of the fifth microstrip line and electrically connect the second grounding face and the second extending ground face;

the third grounding face and the third extending ground face are formed therebetween with a plurality of conductive through-holes which surround the third auxiliary feed-in portion, extend along two sides of the sixth microstrip line and electrically connect the third grounding face and the third extending ground face.

8. The antenna device of claim 6, wherein the first extending ground face is provided therein with a first primary ground soldering pad, a first auxiliary ground soldering pad, a second primary ground soldering pad and a second auxiliary ground soldering pad, and the second face is provided thereon with a first primary feed-in soldering pad which is adjacent to the first primary ground soldering pad, is surrounded by the first extending ground face and is spaced apart from the first extending ground face, the second face is provided thereon with a first auxiliary feed-in soldering pad which is adjacent to the first auxiliary ground soldering pad, is surrounded by the first extending ground face and is spaced apart from the first extending ground face, the second face is provided thereon with a second primary feed-in soldering pad which adjacent to the second primary ground soldering pad, is surrounded by the first extending ground face and is spaced apart from the first extending ground face, the second face is provided thereon with a second auxiliary feed-in soldering pad which is adjacent to the second auxiliary ground soldering pad, is surrounded by the first extending ground face and is spaced apart from the first extending ground face;

wherein the second extending ground face is provided therein with a third primary ground soldering pad, and the second face is provided thereon with a third primary feed-in soldering pad which is adjacent to the third primary ground soldering pad, is surrounded by the second extending ground face and is spaced apart from the second extending ground face;

wherein the third extending ground face is provided therein with a third auxiliary ground soldering pad, and the second face is provided thereon with a third auxiliary feed-in soldering pad which is adjacent to the third auxiliary ground soldering pad, is surrounded by the third extending ground face and is spaced apart from the third extending ground face;

wherein the first primary feed-in soldering pad and the first primary feed-in portion correspond to each other and the first primary feed-in soldering pad and the first primary feed-in portion are formed therebetween with a plurality of conductive through-holes which electrically connect the first primary feed-in soldering pad and the first primary feed-in portion, the first primary ground soldering pad and the first primary grounding portion correspond to each other and the first primary ground soldering pad and the first primary grounding portion are formed therebetween with a plurality of conductive through-holes which electrically connect the first primary ground soldering pad and the first primary grounding portion;

the first auxiliary feed-in soldering pad and the first auxiliary feed-in portion correspond to each other and the first auxiliary feed-in soldering pad and the first auxiliary feed-in portion are formed therebetween with a plurality of conductive through-holes which electrically connect the first auxiliary feed-in soldering pad and the first auxiliary feed-in portion, the first auxiliary ground soldering pad and the first auxiliary grounding portion correspond to each other and the first auxiliary ground soldering pad and the first auxiliary grounding portion are formed therebetween with a plurality of conductive through-holes which electrically connect the first auxiliary ground soldering pad and the first auxiliary grounding portion;

the second primary feed-in soldering pad and the second primary feed-in portion correspond to each other and the second primary feed-in soldering pad and the second primary feed-in portion are formed therebetween with a plurality of conductive through-holes which electrically connect the second primary feed-in soldering pad and the second primary feed-in portion, the second primary ground soldering pad and the second primary grounding portion correspond to each other and the second primary ground soldering pad and the second primary grounding portion are formed therebetween with a plurality of conductive through-holes which electrically connect the second primary ground soldering pad and the second primary grounding portion;

the second auxiliary feed-in soldering pad and the second auxiliary feed-in portion correspond to each other and the second auxiliary feed-in soldering pad and the second auxiliary feed-in portion are formed therebetween with a plurality of conductive through-holes which electrically connect the second auxiliary feed-in soldering pad and the second auxiliary feed-in portion, the second auxiliary ground soldering pad and the second auxiliary grounding portion correspond to each other and the second auxiliary ground soldering pad and the second auxiliary grounding portion are formed therebetween with a plurality of conductive through-holes which electrically connect the second auxiliary ground soldering pad and the second auxiliary grounding portion, wherein the third primary feed-in soldering pad and the third primary feed-in portion correspond to each other and the third primary feed-in soldering pad and the third primary feed-in portion are formed therebetween with a plurality of conductive through-holes which electrically connect the third primary feed-in soldering pad and the third primary feed-in portion, the third primary ground soldering pad and the third primary grounding portion correspond to each other and the third primary ground soldering pad and the third primary grounding portion are formed therebetween with a plurality of conductive through-holes which electrically connect the third primary ground soldering pad and the third primary grounding portion;

the third auxiliary feed-in soldering pad and the third auxiliary feed-in portion correspond to each other and the third auxiliary feed-in soldering pad and the third auxiliary feed-in portion are formed therebetween with a plurality of conductive through-holes which electrically connect the third auxiliary feed-in soldering pad and the third auxiliary feed-in portion, the third auxiliary ground soldering pad and the third auxiliary grounding portion correspond to each other and the third auxiliary ground soldering pad and the third auxiliary grounding portion are formed therebetween with a plurality of conductive through-holes which electrically connect the third auxiliary ground soldering pad and the third auxiliary grounding portion.

9. The antenna device of claim 8, wherein the first primary feed-in soldering pad is used to be soldered with an inner conductor of a first radio frequency transmitting line, the first primary ground soldering pad is used to be soldered with an outer conductor of the first radio frequency transmitting line which is insulated from the inner conductor of the first radio frequency transmitting line;

the first auxiliary feed-in soldering pad is used to be soldered with an inner conductor of a second radio frequency transmitting line, the first auxiliary ground soldering pad is used to be soldered with an outer conductor of the second radio frequency transmitting line which is insulated from the inner conductor of the second radio frequency transmitting line;

the second primary feed-in soldering pad is used to be soldered with an inner conductor of a third radio frequency transmitting line, the second primary ground soldering pad is used to be soldered with an outer conductor of the third radio frequency transmitting line which is insulated from the inner conductor of the third radio frequency transmitting line;

the second auxiliary feed-in soldering pad is used to be soldered with an inner conductor of a fourth radio frequency transmitting line, the second auxiliary ground soldering pad is used to be soldered with an outer conductor of the fourth radio frequency transmitting line which is insulated from the inner conductor of the fourth radio frequency transmitting line;

the third primary feed-in soldering pad is used to be soldered with an inner conductor of a fifth radio frequency transmitting line, the third primary ground soldering pad is used to be soldered with an outer conductor of the fifth radio frequency transmitting line which is insulated from the inner conductor of the fifth radio frequency transmitting line;

the third auxiliary feed-in soldering pad is used to be soldered with an inner conductor of a sixth radio frequency transmitting line, the third auxiliary ground soldering pad is used to be soldered with an outer conductor of the sixth radio frequency transmitting line which is insulated from the inner conductor of the sixth radio frequency transmitting line.

10. The antenna device of claim 9, wherein the antenna device further comprises an outer casing which accommodates the circuit board and at least one elastic filler which is filled in at least one opening of the outer casing, and the first to sixth radio frequency transmitting lines enter into the outer casing via the at least one opening, and the at least one elastic filler allows the first to sixth radio frequency transmitting lines to pass through, so as to fix the first to sixth radio frequency transmitting lines on the outer casing.

11. The antenna device of claim 1, wherein the antenna device further comprises a global navigation satellite system antenna, the global navigation satellite system antenna comprises a daughter circuit board which is separated from the circuit board and a ceramic dielectric antenna which operates at a fourth frequency range, the ceramic dielectric antenna is provided on a face of the daughter circuit board.

12. The antenna device of claim 11, wherein the global navigation satellite system antenna further comprises a low-noise amplifying circuit, the low-noise amplifying circuit is provided on another face the daughter circuit board, the ceramic dielectric antenna is electrically connected with the low-noise amplifying circuit via a feeding pin which passes through the daughter circuit board; and a feed-in end of the low-noise amplifying circuit is electrically connected with an inner conductor of a seventh radio frequency transmitting line, and an outer conductor of the seventh radio frequency transmitting line which is insulated from the inner conductor of the seventh radio frequency transmitting line is electrically connected with a ground soldering pad which is formed on the another face, and the ground soldering pad is electrically connected with a grounding portion which is provided on the face of the daughter circuit board.

13. The antenna device of claim 1, wherein the antenna device further comprises a global navigation satellite system antenna, the global navigation satellite system antenna comprises a ceramic dielectric antenna which operates at a fourth frequency range, the ceramic dielectric antenna is provided on the first face of the dielectric substrate.

14. The antenna device of claim 13, wherein the dielectric substrate further has a second face which is opposite to the first face, the global navigation satellite system antenna further comprises a low-noise amplifying circuit, the low-noise amplifying circuit is provided on the second face of the dielectric substrate, the ceramic dielectric antenna is electrically connected with the low-noise amplifying circuit via a feeding pin which passes through the dielectric substrate; and a feed-in end of the low-noise amplifying circuit is electrically connected with an inner conductor of a seventh radio frequency transmitting line, and an outer conductor of the seventh radio frequency transmitting line which is insulated from the inner conductor of the seventh radio frequency transmitting line is electrically connected with a ground soldering pad which is formed on the second face, and the ground soldering pad is electrically connected with a grounding portion which is provided on the first face.

15. The antenna device of claim 6, wherein the first primary antenna, the first auxiliary antenna, the second primary antenna, the second auxiliary antenna, the third primary antenna, the third auxiliary antenna, the grounding unit and the first to sixth microstrip lines are respectively formed from copper foils which are printed on the first face and the second face of the dielectric substrate.

16. The antenna device of claim 1, wherein the first primary antenna is a LTE/5G wide frequency band primary antenna, the first auxiliary antenna is LTE/5G wide frequency band auxiliary antenna, the second primary antenna is a WiFi wide frequency band primary antenna, the second auxiliary antenna is a WiFi wide frequency band auxiliary antenna, the third primary antenna is a 5G wide frequency band primary antenna, and the third auxiliary antenna is a 5G wide frequency band auxiliary antenna.

17. The antenna device of claim 11, wherein the first frequency range contains 600-960 MHz, 1400-1550 MHz, 1710-2690 MHz, 3300-4200 MHz and 4400-5000 MHz;

the second frequency range contains 2400-2485 MHz, 5150-5850 MHz and 5925-7125 MHz;

the third frequency range contains 1400-1550 MHz, 1710-2690 MHz, 3300-4200 MHz and 4400-5000 MHz;

the fourth frequency range contains 1555-1610 MHz.

18. The antenna device of claim 2, wherein the first primary feed-in portion and the first primary grounding portion respectively allow an inner conductor and an outer conductor of a first radio frequency transmitting line to soldered therewith;

the first auxiliary feed-in portion and the first auxiliary grounding portion respectively allow an inner conductor and an outer conductor of a second radio frequency transmitting line to be soldered therewith;

the second primary feed-in portion and the second primary grounding portion respectively allow an inner conductor and an outer conductor of a third radio frequency transmitting line to be soldered therewith;

the second auxiliary feed-in portion and the second auxiliary grounding portion respectively allow an inner conductor and an outer conductor of a fourth radio frequency transmitting line to be soldered therewith;

the third primary feed-in portion and the third primary grounding portion respectively allow an inner conductor and an outer conductor of a fifth radio frequency transmitting line to be soldered therewith;

the third auxiliary feed-in portion and the third auxiliary grounding portion respectively allow an inner conductor and an outer conductor of a sixth radio frequency transmitting line to be soldered therewith.

19. The antenna device of claim 11, wherein the ceramic dielectric antenna has a feeding pin, the face of the daughter circuit board is provided with a grounding portion, the feeding pin and the grounding portion respectively allow an inner conductor and an outer conductor of a seventh radio frequency transmitting line to be electrically connected therewith.

20. The antenna device of claim 13, wherein the ceramic dielectric antenna has a feeding pin, the first face of the dielectric substrate is provided with a grounding portion, the feeding pin and the grounding portion respectively allow an inner conductor and an outer conductor of a seventh radio frequency transmitting line to be electrically connected therewith.

* * * * *